(12) United States Patent
Tateyama

(10) Patent No.: US 6,208,333 B1
(45) Date of Patent: *Mar. 27, 2001

(54) IMAGE PROCESSING SYSTEM INCLUDING IMAGE DATA COMPRESSION

(75) Inventor: Seiji Tateyama, Hokkaido (JP)

(73) Assignee: Hudson Soft Co., Ltd., Sapporo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/786,377

(22) Filed: Jan. 17, 1997

Related U.S. Application Data

(62) Division of application No. 08/467,439, filed on Jun. 6, 1995, now Pat. No. 5,812,119, which is a division of application No. 08/123,179, filed on Sep. 20, 1993, now Pat. No. 5,515,077.

(30) Foreign Application Priority Data

| Oct. 9, 1992 | (JP) | 4-298071 |
| Oct. 14, 1992 | (JP) | 4-300668 |
| Oct. 14, 1992 | (JP) | 4-300669 |

(51) Int. Cl.$^7$ .................................................. G09G 5/00
(52) U.S. Cl. .................................................. 345/202; 345/199
(58) Field of Search ............................... 345/123, 124, 345/509, 515, 16, 17, 199, 202, 186, 149, 150; 382/245, 166

(56) References Cited

U.S. PATENT DOCUMENTS

| 4,684,923 | * | 8/1987 | Koga . |
| 4,803,478 | | 2/1989 | Olsen . |
| 4,851,834 | | 7/1989 | Stockebrand . |
| 4,999,709 | | 3/1991 | Yamazaki . |

FOREIGN PATENT DOCUMENTS

| 065862 | 12/1982 | (EP) . |
| 328356 | 8/1989 | (EP) . |
| 465102 | 1/1992 | (EP) . |
| 493881 | 7/1992 | (EP) . |
| 522697 | 1/1993 | (EP) . |
| 524468 | 1/1993 | (EP) . |
| 2137857 | 4/1984 | (GB) . |
| 2210239 | 8/1988 | (GB) . |
| WO85/02048 | 5/1985 | (WO) . |

OTHER PUBLICATIONS

"High Performance Display System for Dynamic Image Generation", John Staudhammer et al., Proceedings of the Second International Conference on Computers and Applications, IEEE Press New York, Jun. 23, 1987, (US), Jun. 27, 1987 (China), pp. 336–343.

* cited by examiner

Primary Examiner—Chanh Nguyen
(74) Attorney, Agent, or Firm—McDermott, Will & Emery

(57) ABSTRACT

Image data are defined by color vectors each composed of vector factors. Each vector factor specifies the brightness and color difference of a dot. The image data are transmitted with a normal timing when the vector factors correspond to dots of the image one for one, and are transmitted with another timing in another case to scroll the image horizontally.

3 Claims, 33 Drawing Sheets

FIG. 1 PRIOR ART
1 6 COLOR MODE
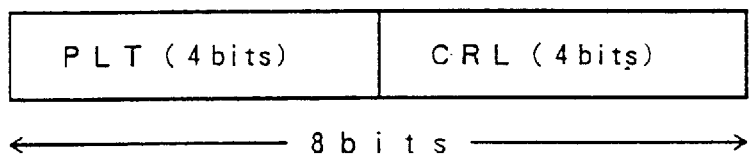
3 2 COLOR MODE
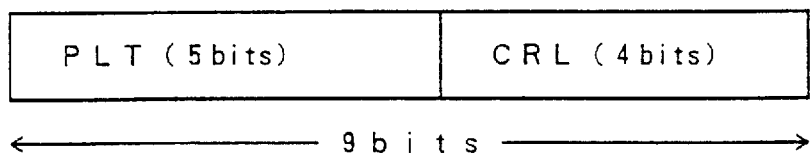
6 4 COLOR MODE
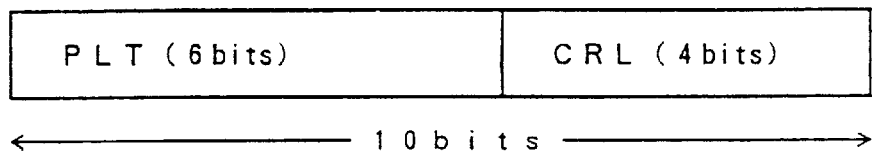
1 2 8 COLOR MODE
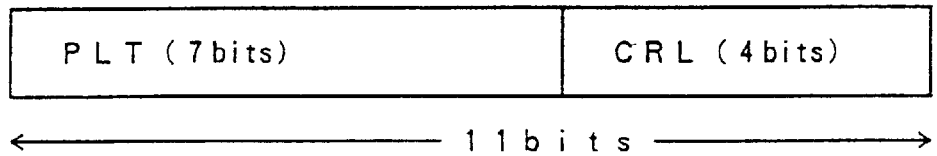

32 COLOR MODE

IMAGE DATA EXTENSION UNIT

FIG. 12A

TRANSFER CONTROL REGISTER

| 7 | 6 | 5 | 4 | 3 | 2 | 1 | 0 |
|---|---|---|---|---|---|---|---|
|   |   |   |   |   |   | RAIN INT | RAIN EN |

RAIN EN = 1 TRANSFER START
RAIN INT = 1 INTERRUPTION ENABLE OF RASTER MONITORING REGISTER

FIG. 12B

START ADDRESS REGISTER

| 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| -A/B | KA16 | KA15 | KA14 | KA13 | KA12 | KA11 | KA10 | KA9 | KA8 | KA7 | KA6 | KA5 | KA4 | KA3 | KA2 | KA1 | KA0 |

FIG. 12C

TRANSFER START REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| not used | | | | | | | | RASTER No. (0~262) | | | | | | | |

FIG. 12D
TRANSFER BLOCK NUMBER REGISTER

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| not used ||||||||||| NUMBER OF BLOCK |||||

FIG. 12E
RASTER MONITORING REGISTER

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| not used |||||||| RASTER No. (0~262) ||||||||

( ) : MONOCHROME MODE

F I G. 1 9
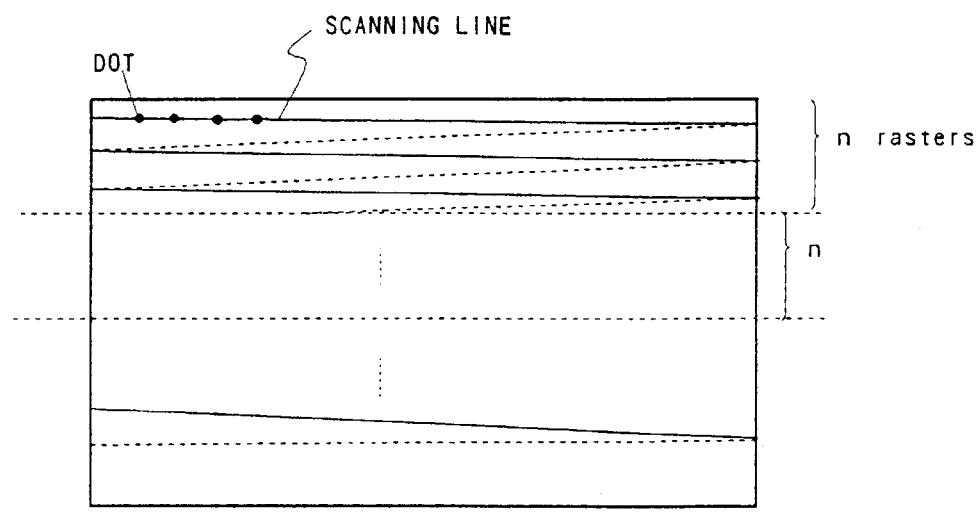
F I G. 2 0
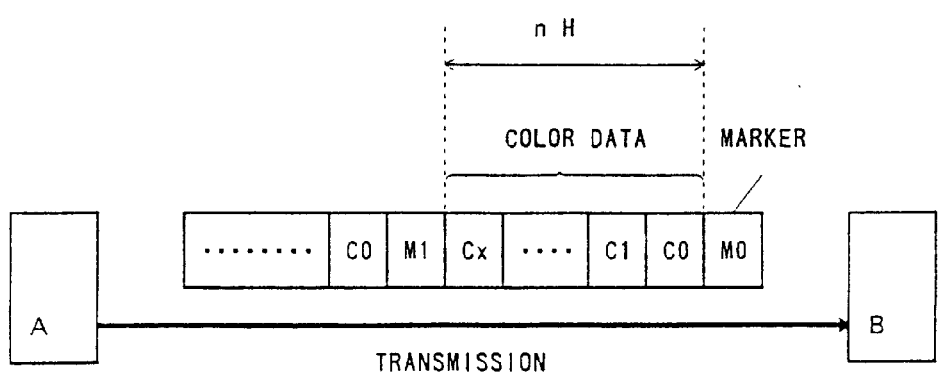

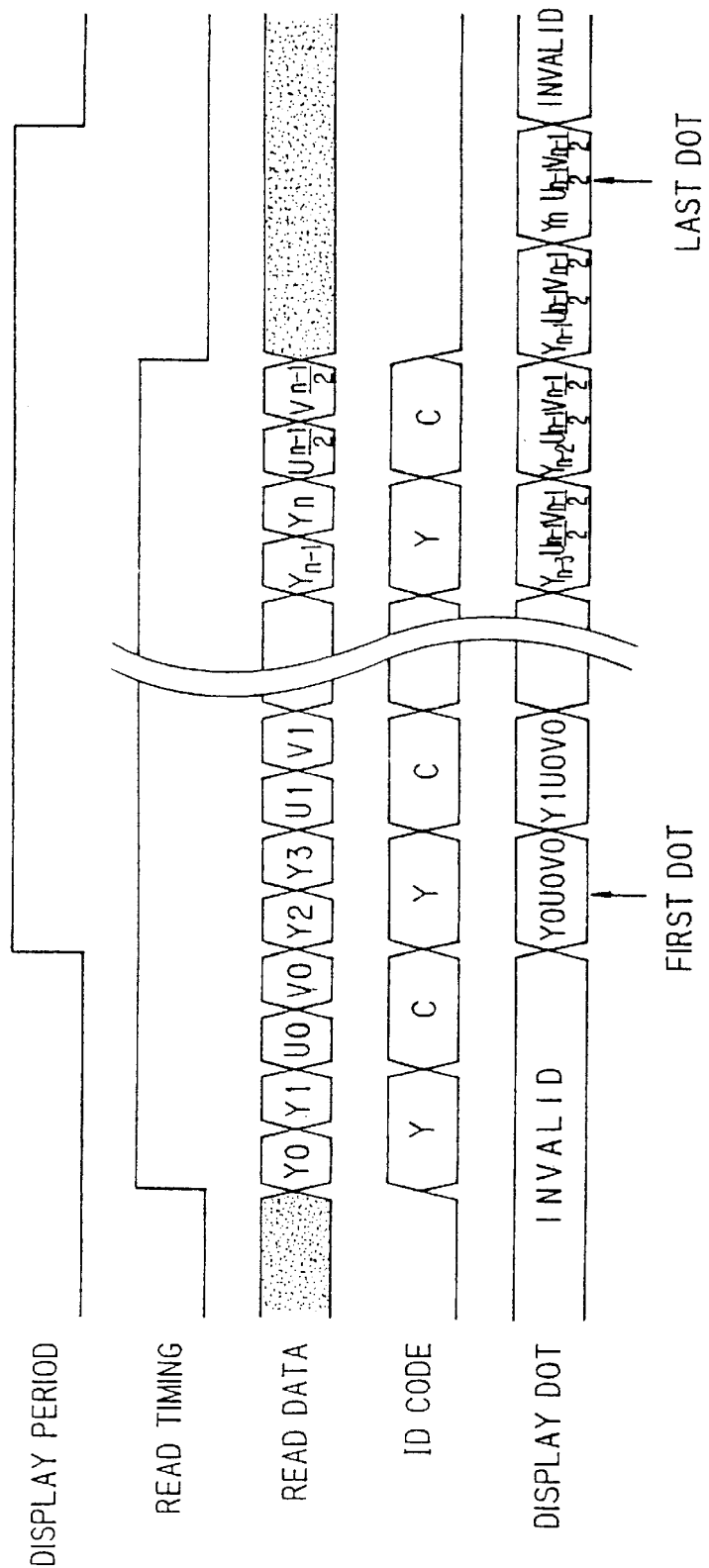

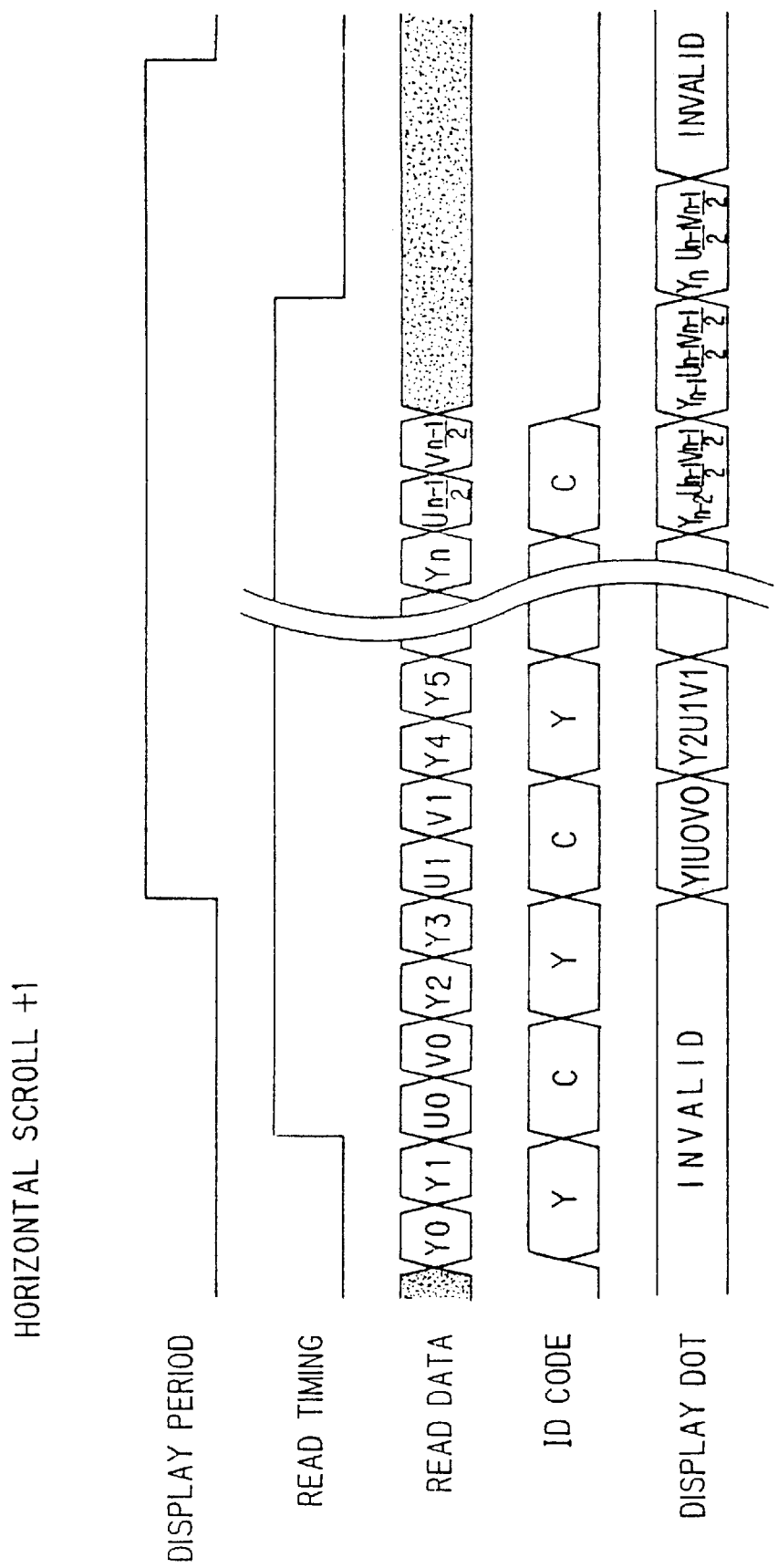

FIG. 25

HDISP

DCK

ONE DOT LEFT SCROLL ("CHAZUTSU" MODE)

RT0~RT7 OUTPUT DATA: Y0 Y1 U0 V0 Y2 Y3 U1 ... Y127 Y255 V127 ... Y0 Y1 U0 V0

RTCODE0~1 OUTPUT DATA: 00  11 11 10 10 11 11 11 10 ... 11 10 10 11 11 10 10  00  INVALID

ONE DOT RIGHT SCROLL ("NON-CHAZUTSU" MODE)

RT0~RT7 OUTPUT DATA: Y0 Y1 U0 ... U126 Y254 U127 Y253 V126 Y255 V127

RTCODE0~1 OUTPUT DATA: 00  11 11 10 ... 11 10 10 11 11 10 10  00  INVALID

RT0~RT7 ; DATA BUS (8bits, 93nsCYCLE)
RTCODE1
  ~RTCODE0; TYPE OF IMAGE DATA
       11  IDCT Y COMPONENT
       10  IDCT UV COMPONENT
       01  RUN-LENGTH PALLET DATA
       00  INVALID SIGNAL

-HSYNC; HORIZONTAL SYNCHRONIZING SIGNAL

FIG. 28

| SCROLL DOT | DELAY TIMING (CLOCK) | FIRST FACTOR READ | FIRST FACTOR DISPLAY | LAST FACTOR READ | LAST FACTOR DISPLAY | |
|---|---|---|---|---|---|---|
| 0 | | 0 | Y0Y1U0V0 | Y0U0V0 | Yn-2Yn-1UmVm | Yn-1UmVm | NO SCROLL |
| +1 | NON-ENDLESS | +2 | Y0Y1U0V0 | Y1U0V0 | Yn-2Yn-1UmVm | INVALID | ONE DOT LEFT SCROLL |
| | ENDLESS | | Y0Y1U0V0 | | Y0Y1U0V0 | Y0U0V0 | |
| -1 | NON-ENDLESS | -2 | Y0Y1U0V0 | INVALID | Yn-2Yn-1UmVm | Yn-2UmVm | ONE DOT RIGHT SCROLL |
| | ENDLESS | +2 | Yn-2Yn-1UmVm | Vn-1UmVm | Yn-2Yn-1UmVm | Yn-2UmVm | |

IMAGE PROCESSING SYSTEM INCLUDING IMAGE DATA COMPRESSION

This application is a division of application Ser. No. 08/467,439 filed Jun. 6, 1995 now U.S. Pat. No. 5,812,119, which is a divisional of application Ser. No. 08/123,179 filed Sep. 20, 1993 now U.S. Pat. No. 5,575,077.

BACKGROUND OF THE INVENTION

The present invention relates to an image processing system, and more particularly to a game computer system processing a variety of images such as a natural picture together with an animation picture.

In a conventional game computer system, image data are defined by color for each dot. The colors of the image data are managed by a color pallet formed in a memory, the color pallet storing many pallet codes (PLT) corresponding to color data.

In the conventional game computer system, image data are compressed (encoded) to be transmitted, and then the compressed data are extended (decoded) to be displayed. Each piece of image data is composed of the pallet code (PLT) and the number (CRL) thereof, which is called a pallet length. The compression method is called a "run-length" method.

When a single color mode is employed for each screen, image data may be fixed in length (bits); however, when plural color modes are used for one screen, the lengths of the image data are different depending on the color mode.

FIG. 1 shows the formats of image data according to the conventional game computer system, which employs 16, 32, 64 and 128 color modes. The pallet codes are defined by data of 4, 5, 6, and 7 bits for the 16, 32, 64 and 128 color modes, respectively. The length "L" of the pallet code in a color mode "m" is given by the following equation.

$$L = \log_2 m$$

For example, the length "L" of the pallet code in the 128 color mode becomes "7" as follows:

$$L = \log_2 128 = \log_2 2^7 = 7$$

The data needs to have a width corresponding to a bus line to be transmitted thereon, because the widths of buses vary depending on the system.

When the image data are transmitted on a 8 bit bus, the data for the 16 color mode may be transmitted in entirely, as shown in FIG. 1; however, when the length of the image data to be transmitted is not a multiple of 8 bits, the data need to be divided, as shown in FIG. 2. For example, image data for the 32 color mode are compressed to 9 bits, the data are divided as 8 and 1 to be transmitted, and as a result, the left over one bit is transmitted with the following data.

In the conventional game computer system, when the screen is divided into plural areas of different colors, the color mode of the greatest number is selected, because each picture is displayed using only one color mode. For example, when an animation picture with 16 colors and a natural picture with 16M colors are synthesized on the screen, the synthesized picture is displayed in the 16M color mode. Such a processing method is not effective for using the memory.

SUMMARY OF THE INVENTION

Accordingly, it is an object of the present invention to provide an image processing system in which image data may be scrolled in a horizontal direction even if each color vector factor does not correspond to one dot in a screen.

It is another object of the present invention to provide an image processing system in which image data may be transmitted effectively.

It is still another object of the present invention to provide an image processing system in which image data may be displayed in plural different color modes on a screen effectively.

According to a first feature of the present invention, image data are transmitted with a normal timing when vector factors correspond to dots of the image one for one, and are transmitted with another timing in the other case to scroll the image horizontally.

According to a second feature of the present invention, length of data blocks is adjusted whereby the length becomes an integral multiple of a predetermined fixed value, for example bus width.

According to a third feature of the present invention, a screen is horizontally divided into plural blanking areas. The image data are displayed for each divided blanking area in a predetermined color mode.

BRIEF DESCRIPTION OF THE DRAWINGS

FIG. 1 is a diagram showing the arrangements of color data according to a conventional game computer system.

FIGS. 12A to 12E are diagrams showing the configurations of transfer control, start address, transfer start, transfer block number and raster monitoring registers, respectively.

FIG. 19 is a diagram showing the screen divided into plural areas according to the invention.

FIG. 20 is a diagram showing the configuration of image data to be transmitted according to the invention.

FIG. 21 is a timing chart for transmission of image data when the real screen is not scrolled, according to the invention.

FIG. 22 is a timing chart for transmission of image data when the real screen is scrolled one dot to left, according to the invention.

FIG. 25 is a timing chart for transmission of image data to the video encoder unit when the real screen is scrolled one dot to left, according to the invention.

FIG. 28 is a table showing color vectors to be read and displayed in each scroll mode according to the invention.

DETAILED DESCRIPTION OF THE INVENTION

Figure 2:
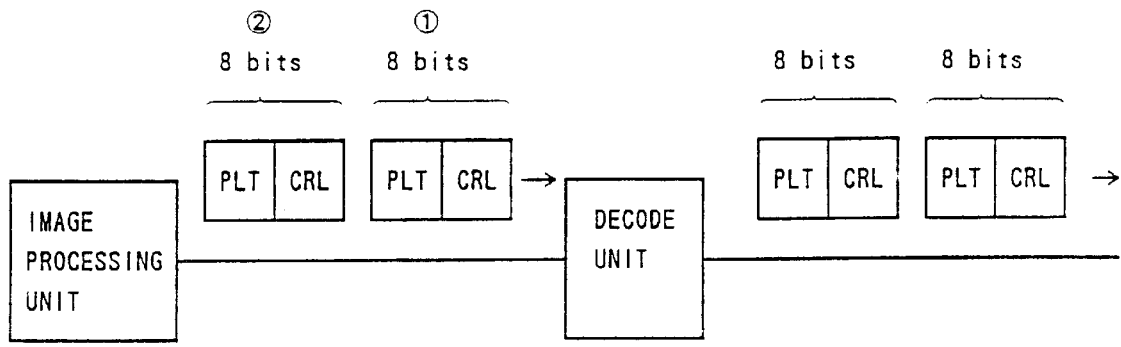
FIG. 2 is a diagram showing the operation for transmitting image data according to the conventional game computer system.
Figure 3:
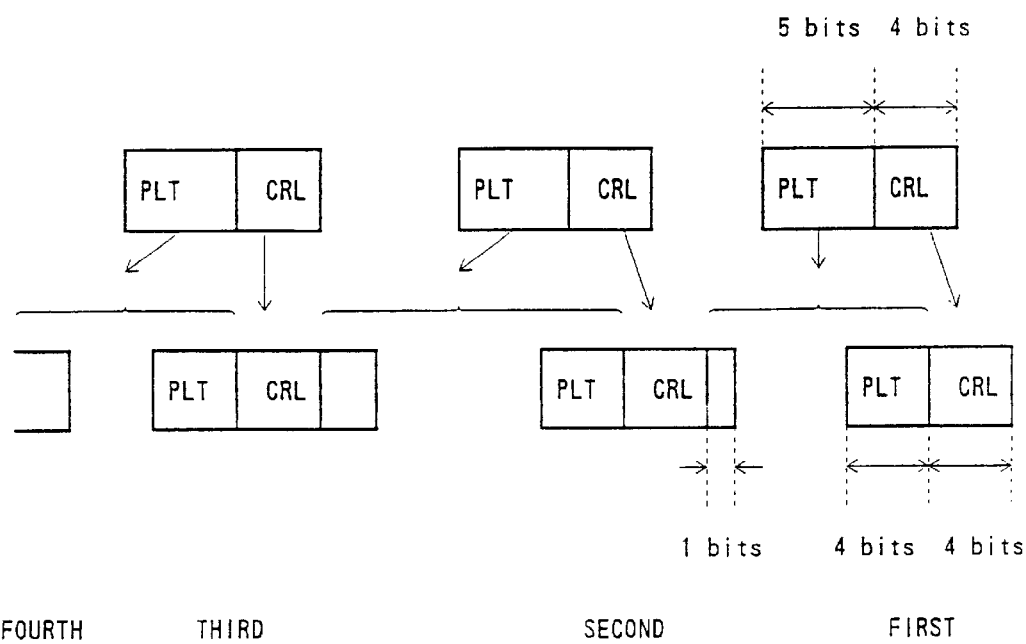
FIG. 3 is a diagram showing the operation for transmitting image data according to the conventional game computer system.
Figure 4:
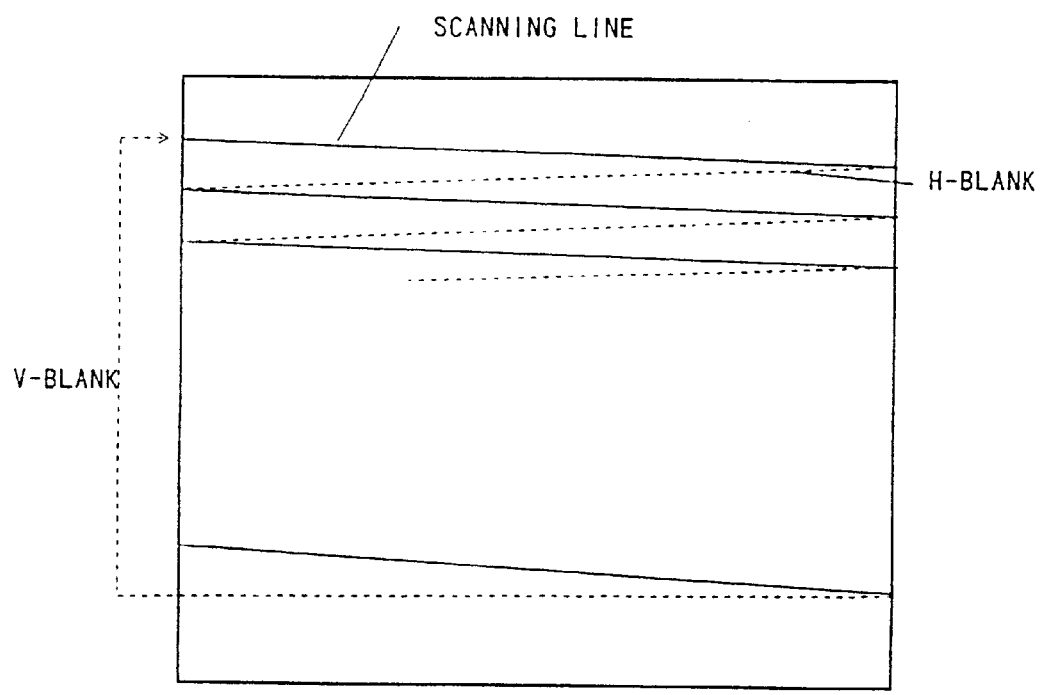
FIG. 4 is a diagram showing the operation for scanning a screen.

FIG. 4 shows a video screen used in a game computer system. In this screen, horizontal and vertical scrolls are performed in H and V blank periods, respectively. The H and V blank periods are called horizontal and vertical fly-back periods, respectively, because a scanning line returns back in these periods. Image data are processed in the fly-back periods, and the data are displayed on a video screen (CRT) in accordance with predetermined display timings. The image data are defined by color data for each dot, the color data being specified by a RGB or YUV system.

Figure 5:
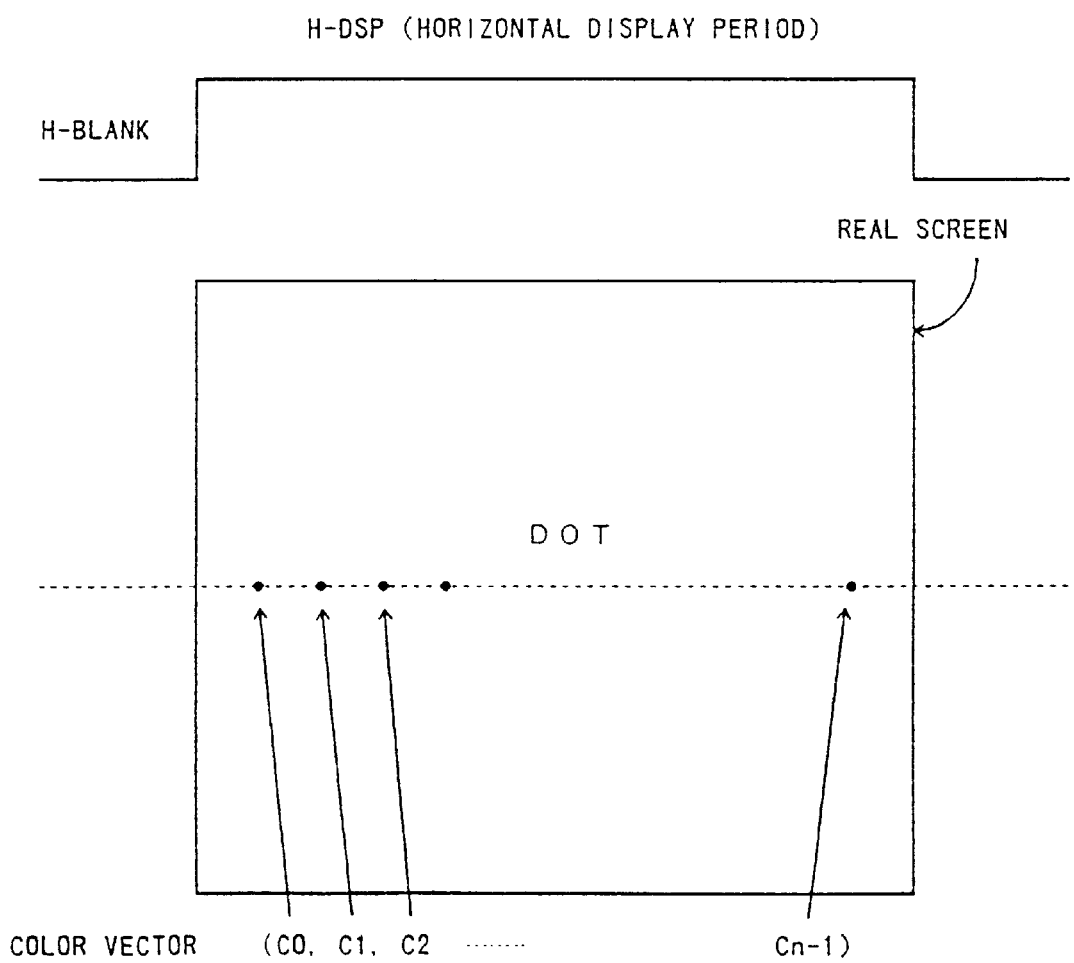
FIG. 5 is a diagram showing a relation between a screen and color vectors thereon.

The color data are specified for each raster, such as (C0, C1, C2, - - - , Cn−1) shown in FIG. 5; the data unit is called a color vector. The color vector is composed of color-vector factors C0, C1, C2, - - - , Cn−1. In this case, the color-vector factors correspond to dots of image data one for one. Image data to be displayed are read from a virtual screen, which is derived from a video RAM (VRAM), in a H-blank period for the previous image data, so that the image data are displayed in the next H-blank period.

Figure 6:
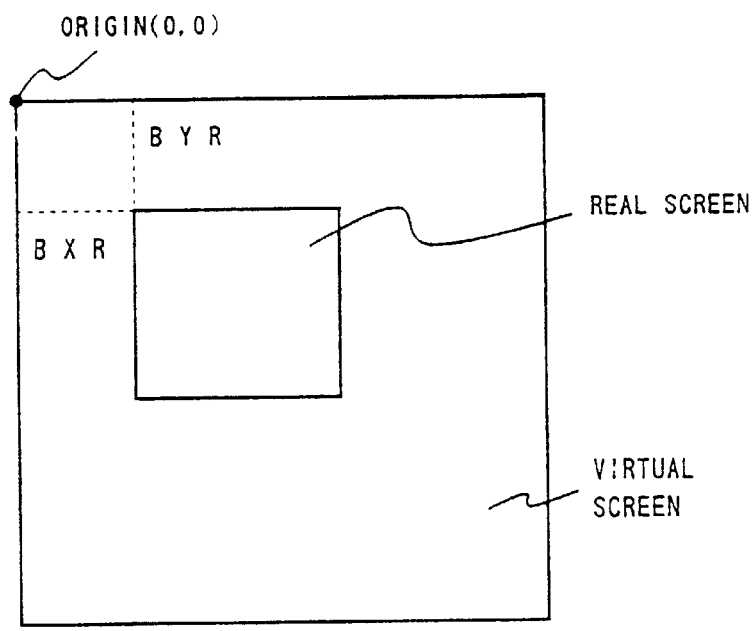
FIG. 6 is a diagram showing a relation between real and virtual screens.
Figure 7:
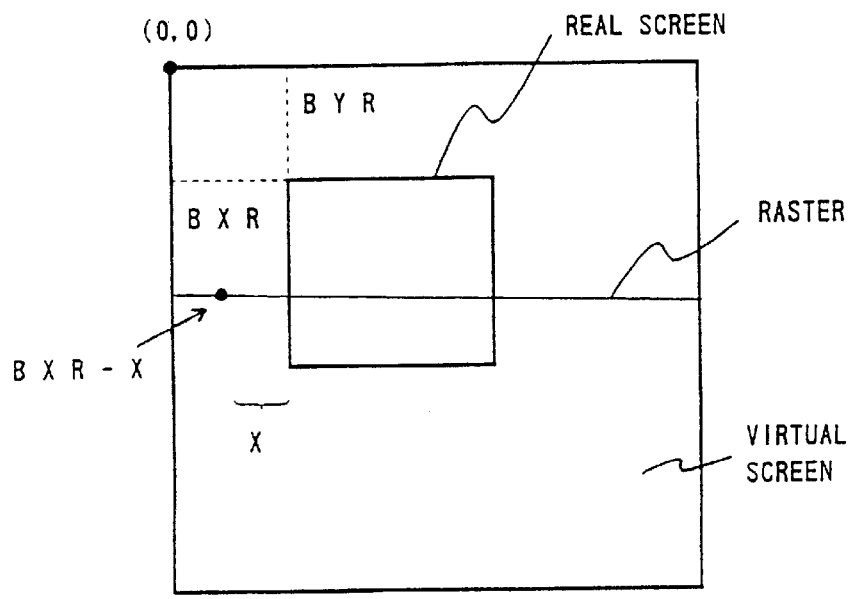
FIG. 7 is a diagram showing the operation for scrolling the real screen on the virtual screen.

The virtual screen is formed to be larger than the real screen (CRT), so that a part of the virtual screen is displayed on the real screen. In the virtual screen, an area to be displayed is specified by coordinates BXR and BYR, as shown in FIG. 6. The coordinates BXR and BYR are specified in dot and raster by BGX and BGY registers, respectively. When the BGX register is set at "BXR-X", the real screen is scrolled "X" dots to the right, as shown in FIG. 7. When the image data are read from the virtual screen in the previous raster-transmission period, the BGX register becomes effective from the next raster.

If color-vector factors do not correspond to dots in the real screen one for one, some problems occur.

Figure 8:
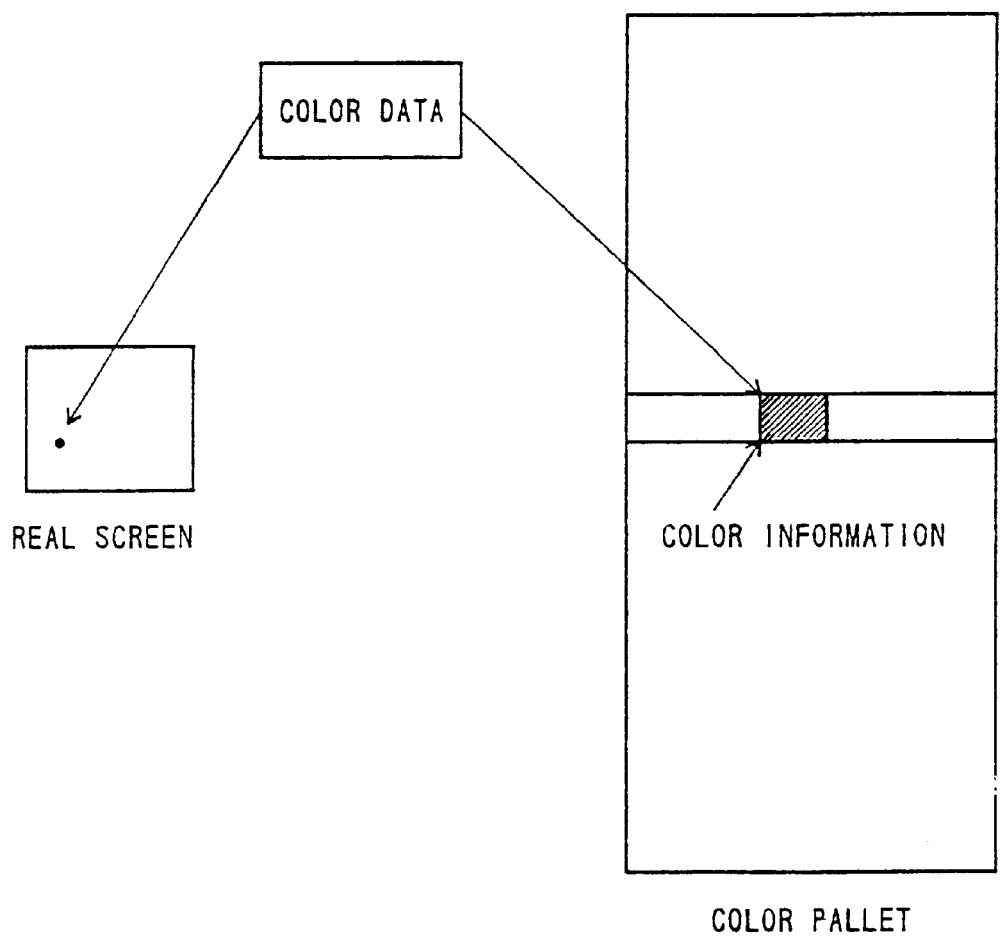
FIG. 8 is a diagram showing a relation between dots on the real screen and a color pallet.

For a conventional game computer that mainly treats animation images, it is sufficient to use a small number of color such as 4, 16 or 256 colors to display image. In general, color data are specified for each dot by color information stored in a color pallet, as shown in FIG. 8. When the game computer also treats a natural picture, many colors more than those for the animation image are required. If the colors of the natural picture are specified by the color pallet system, the color pallet is required to have a very large capacity. On the other hand, if color data corresponding to each dot are used to display a natural picture, a large capacity of memory is required as well.

Figure 9:
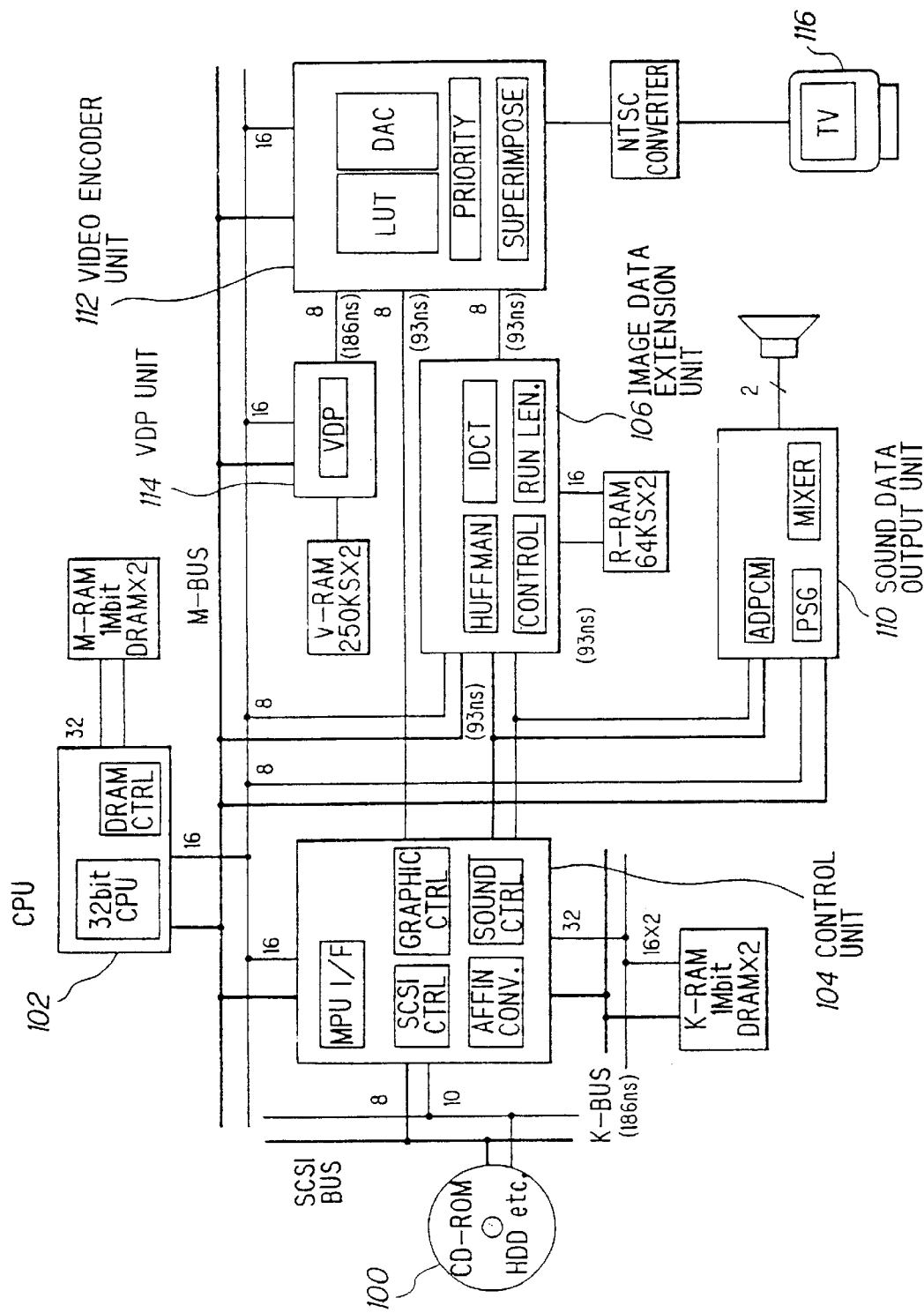
FIG. 9 is a block diagram showing a computer system according to the invention.

FIG. 9 shows a computer system, which includes a game-software recording medium 100 such as a CD-ROM, a CPU 102 of the 32-bit type, a control unit 104 for mainly controlling transmission of image and sound data and interfacing most devices to each other, an image data extension unit 106, an image data output unit, a sound data output unit 110, a video encoder unit 112, a VDP unit 114 and a TV display 116. Control unit 104, image data extension unit 106, video encoder unit 112 and VDP unit 114 are mounted on a common IC chip.

CPU 102, control unit 104, image data extension unit 106 and VDP unit 114 are provided with their own memories M-RAM, K-RAM, R-RAM and V-RAM, respectively.

Image data registered in the CD-ROM are read by the control unit, so that the image data are buffered in the K-RAM, and the image data are compressed to be transmitted to the image data extension unit. The compressed data are decoded by the image data extension unit, and are supplied to the video encoder unit. The video encoder unit processes image data supplied from the controller chip and the other devices to display the image data on the TV monitor.

Figure 10:
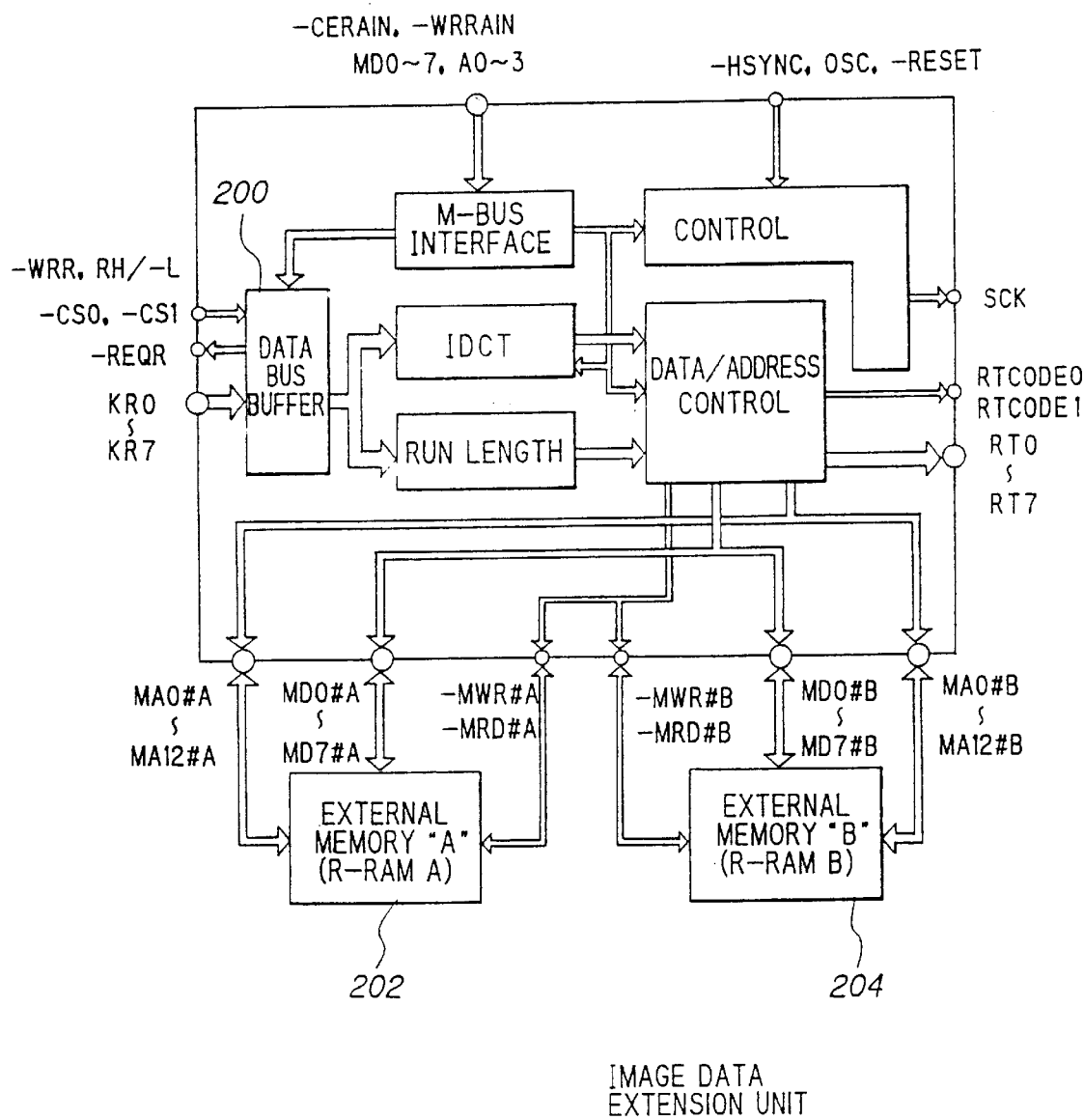
FIG. 10 is a block diagram showing an image extension unit, shown in FIG. 9, according to the invention.

FIG. 10 shows image data extension unit 106. The function of the image data extension unit is now explained. In this figure, a data bus buffer 200 stores image data supplied from the control unit and the like. The image data are divided into plural blocks to be transmitted.

External memory "R-RAM A" and "R-RAM B" 202 and 204 store decoded data. Each of the memories has a capacity for 16 rasters (64K bits). These memories are used alternatively to increase the process speed of image data.

The image data extension unit treats IDCT and run-length images. The IDCT image represents a moving-natural-picture which is produced by IDCT decoding. The run-length image represents a moving-animation-picture which is compressed in accordance with run-length data. In each of the IDCT and run-length image, compressed image occupies "256 dots×240 rasters" for each field. For the IDCT image, 1677 display colors are used. The run-length image are displayed in four run-length color modes of the pallet system, 16, 32, 64 and 128 color modes.

The image data extension unit also includes data bus terminals KR0 to KR7 for receiving data transmitted from the control unit, and data request terminal -REQR for supplying a data request signal to the control unit. In response to the request signal, compressed image data are supplied from the control unit. That is, "-REQR=0" and "-REQR=1" represent data request and data stop, respectively.

The image data extension unit needs to decode the compressed image data of 16 rasters within a 16 raster period. For that reason, 16 raster data begin to be transmitted to the image data extension unit in a 16 raster period prior to its display time so that its transmission processing is finished before the previous image is finished being displayed.

The image data extension unit has no information on where the screen is scanned to, and therefore, image data are transmitted in accordance with a signal from the control unit. Image data stored in the image data extension unit are displayed in synchronization with a HSYNC signal supplied from a time 16 rasters after the image data are supplied from the control unit.

Figure 11:
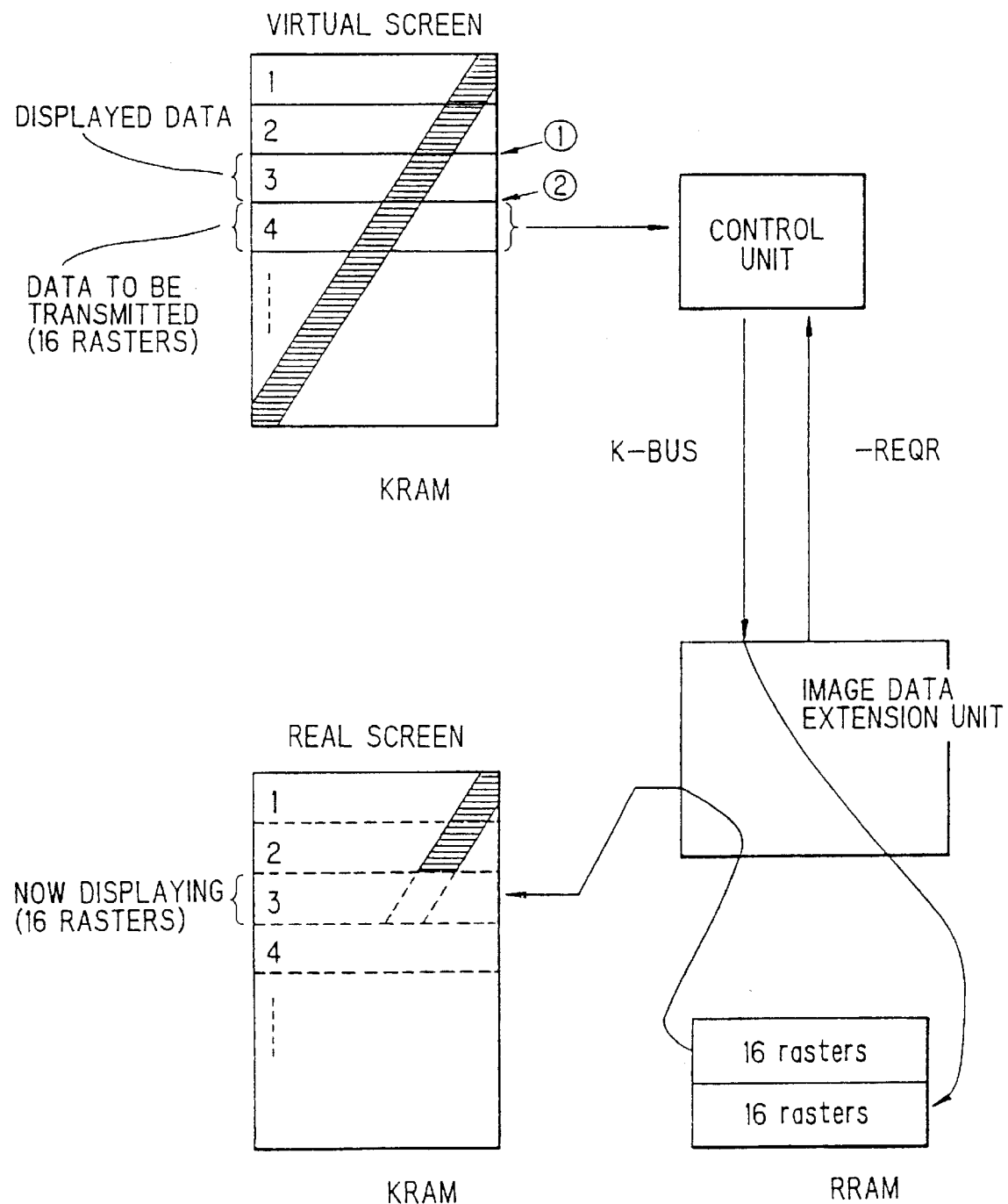
FIG. 11 is a diagram showing the operation for transmitting image data according to the invention.

FIG. 11 shows the operation of the display timing of image data on the video screen. In this embodiment, when a third data of 16 rasters are displayed on the video screen (real screen), a fourth data of 16 rasters are transmitted from the control unit to the image data extension unit, and the transmission is finished before the third data are finished to be displayed on the video screen completely. The process is repeated so that image data for one screen are displayed on the video screen; this is called "normal reproduction".

The image data extension unit has an FIFO (First In-First Out) memory for storing image data supplied from the control unit. The FIFO supplies a disable signal (-REQR=1) to the control unit to stop transmitting data temporarily when the FIFO is filled up with data.

FIGS. 12A to 12E show the configurations of registers built in the control unit. These registers are a transfer control register shown in FIG. 12A, a start address register shown in FIG. 12B for the image data extension unit, and a block number register shown in FIG. 12D.

The transfer control register stores data for specifying enabling and disabling of data transmission. When a disable signal is supplied from the transfer control register to the image data extension unit while some data are transmitted from the image data extension unit, the data transmission is stopped.

The start address register stores data for specifying an initial address of the K-RAM, which stores data for the image data extension unit. It begins with the initial address to transmit data stored in the K-RAM through the control unit. When block data are treated, an access address of the data is increased automatically.

The transfer start register stores data for instructing the start of transmitting data for each raster. When the instruction signal is supplied to the control unit, image data are transmitted from the control unit to the image data extension unit.

The transfer block number register stores data for specifying the number of blocks to be transmitted to the image data extension unit, each block being composed of 16 rasters.

If the contents of any registers are not changed, the same image is again displayed on the same frame. Basically, the registers become effective instantly after their setting; however, when the register is set while a data block is transmitted to the image data extension unit, the register becomes effective after the transmission.

The control unit transmits image data to the image data extension unit, only when the K-BUS has been arbitrated, the image data extension unit has been ready to be accessed and the request signal (-REQR=0) has been supplied from the image data extension unit. On the other hand, data transmission by the control unit to the image data extension unit is disabled when at least one of the following conditions is met:

(1) The image data extension unit has not processed any data yet.

(2) The image data extension unit has the FIFO in the full state.

(3) While HSYNC are counted by 16 times since the first data of 16 lines are received by the image data extension unit, the data have been read entirely.

Therefore, when a first bit of data to be transmitted is disabled, no data is transmitted.

This computer system employs 16, 32, 64, 128 and 16M color modes, and a YUV system for displaying colors. According to the YUV system, colors are defined by a brightness (Y) and color differences (U, V).

In the 16, 32, 64 and 128 color modes, the color pallet is used to specify the color; however, in the 16M color mode, color data corresponding to the color to be displayed are specified directly in order to use the memory effectively.

If 4 bit color data are used to specify 16 colors, the colors are fixed. According to the color pallet, color data for 512 colors may be selected from 65536 colors so that desired 16 colors may be selected flexibly. For each screen, the color pallet is specified using 4 bit data, and an offset value of the color pallet is specified.

In general, 24 bit data are necessary for each dot to display image, and therefore, $2^{24}$ bit data are necessary in the 16M color mode, as shown by the following equation.

$$16M = 16 \times 1K \times 1K = 2^4 \times 10^{10} \times 10^{10} = 2^{24}$$

In the YUV system, each of Y, U and V is defined by 8 bit data. Because, the virtual screen formed in the K-RAM has an area of 1024×1024 dots, 24M bits memory is necessary in the 16M color mode.

Because the 16M color mode is generally employed only for natural pictures taken by a video camera, an image scanner and the like, the virtual screen is not necessarily required. That is, it is sufficient to use the memory capacity of 1.5M bits in the 16M color mode, the memory capacity corresponding to the real screen, which is about one sixteenth that for the virtual screen. In the 16M color mode, in order that 16 bit color data are used for each dot on the average, the color vectors are indicated as follows:

(Y0 Y1 U0 V0, Y2 Y3 U1 V1, - - - , Yn−2 Yn−1 Um Vm), where m=(n−1)/2.

Figure 13:
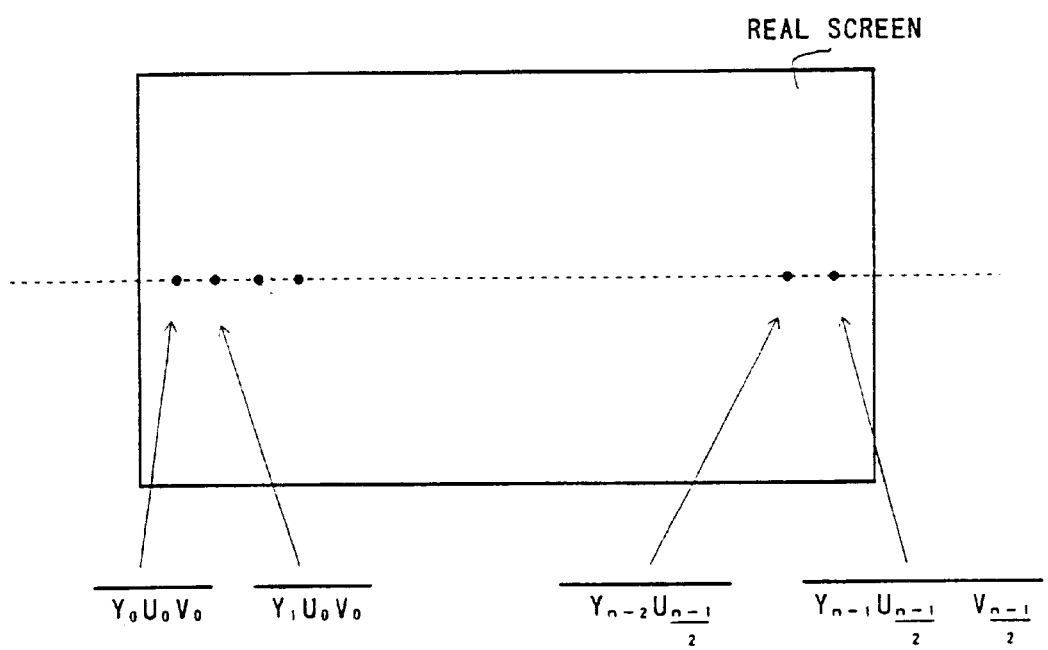
FIG. 13 is a diagram showing a relation between vector factors and dots on the real screen according to the invention.

The color vector in the 16M color mode is shown in FIG. 13. In this case, the next two dots have the same UV values, that is, only the brightness values Ys are different from each other. Because the next two dots in natural pictures are not very different from each other in color, the above mentioned color vector may be used. The two dots are indicated by color data of 32 bits, and as a result, each screen may be displayed by using 1M bit data.

In the 16M color mode, each color-vector factor manages 2 dots. When the screen is scrolled by odd dots horizontally, timing for reading color data becomes important, because dot data not to be displayed are transmitted from the memory.

Figure 14:
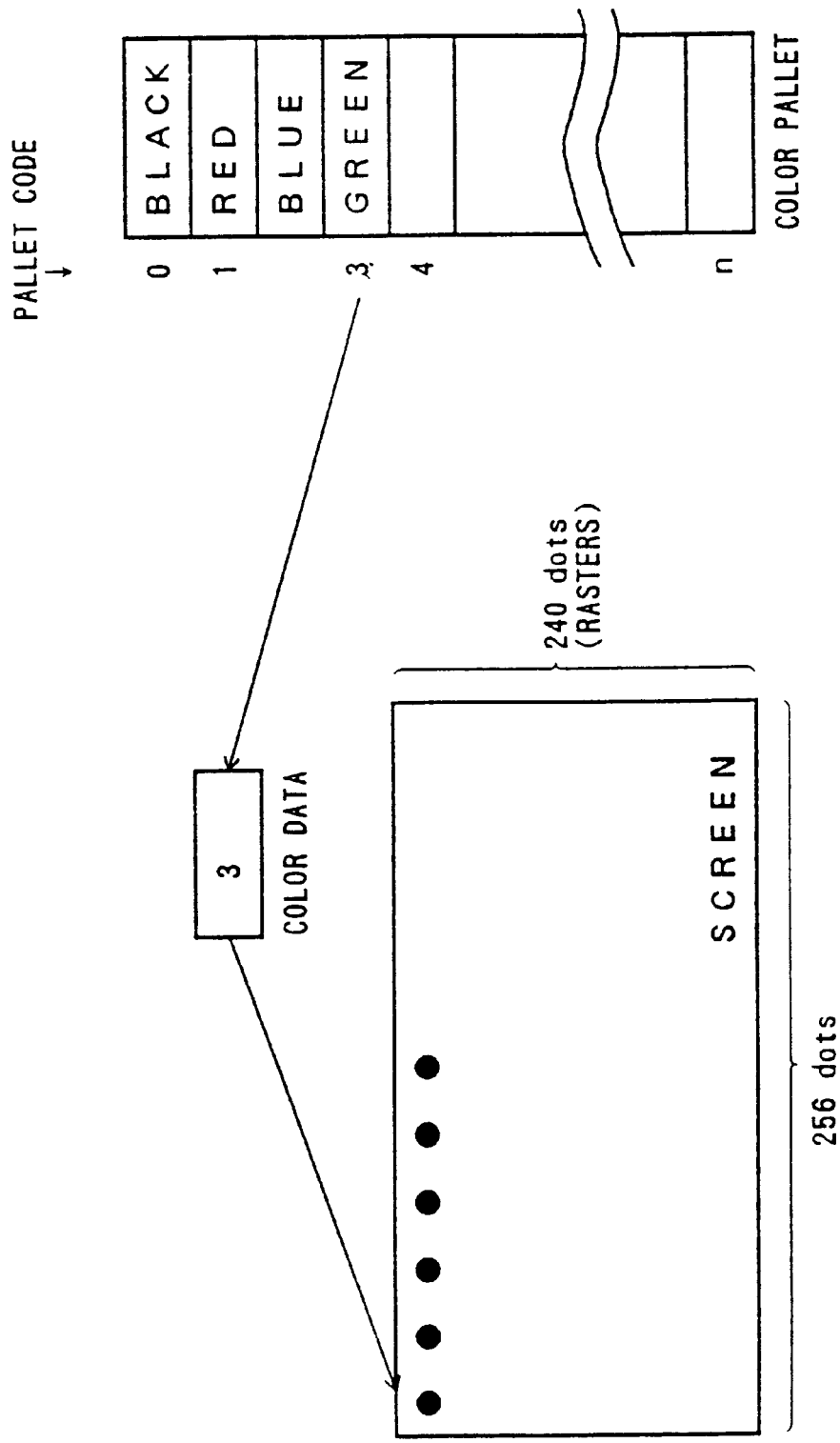
FIG. 14 is a diagram showing a relation between dots on the real screen and a color pallet according to the invention.

In the computer system, as shown in FIG. 14, the color pallet stores pallet codes corresponding to the color data. The video screen is composed of 61440 (256×240) dots. In the 16M color mode, each color data are defined by 4 bits, and therefore, 30K bytes data (61440×4=245760 bits=30720 bytes) are necessary to display one picture. If such a large amount of data are processed directly, it takes very long time to transmit them.

Figure 15:
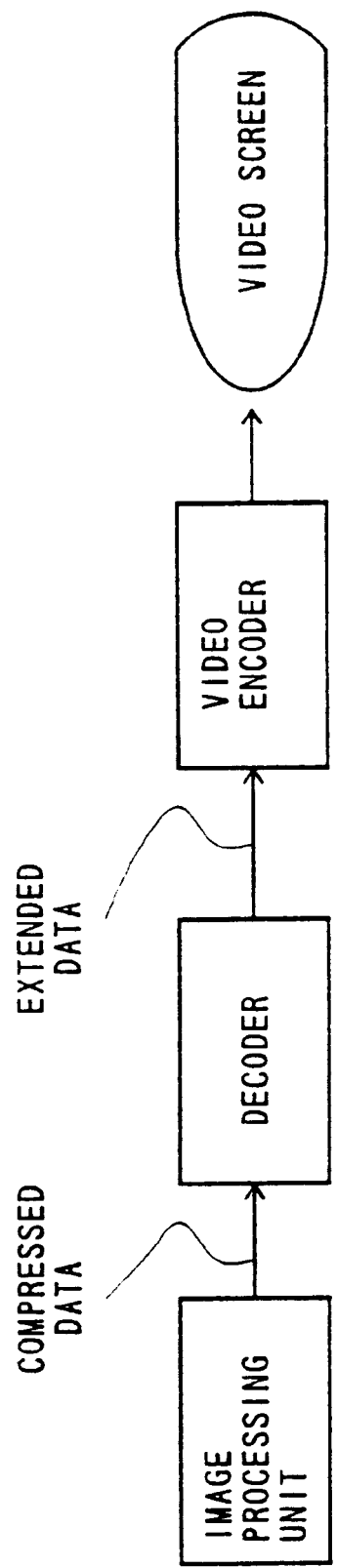
FIG. 15 is a block diagram showing the operation for transmitting image data according to the invention.
Figure 16:
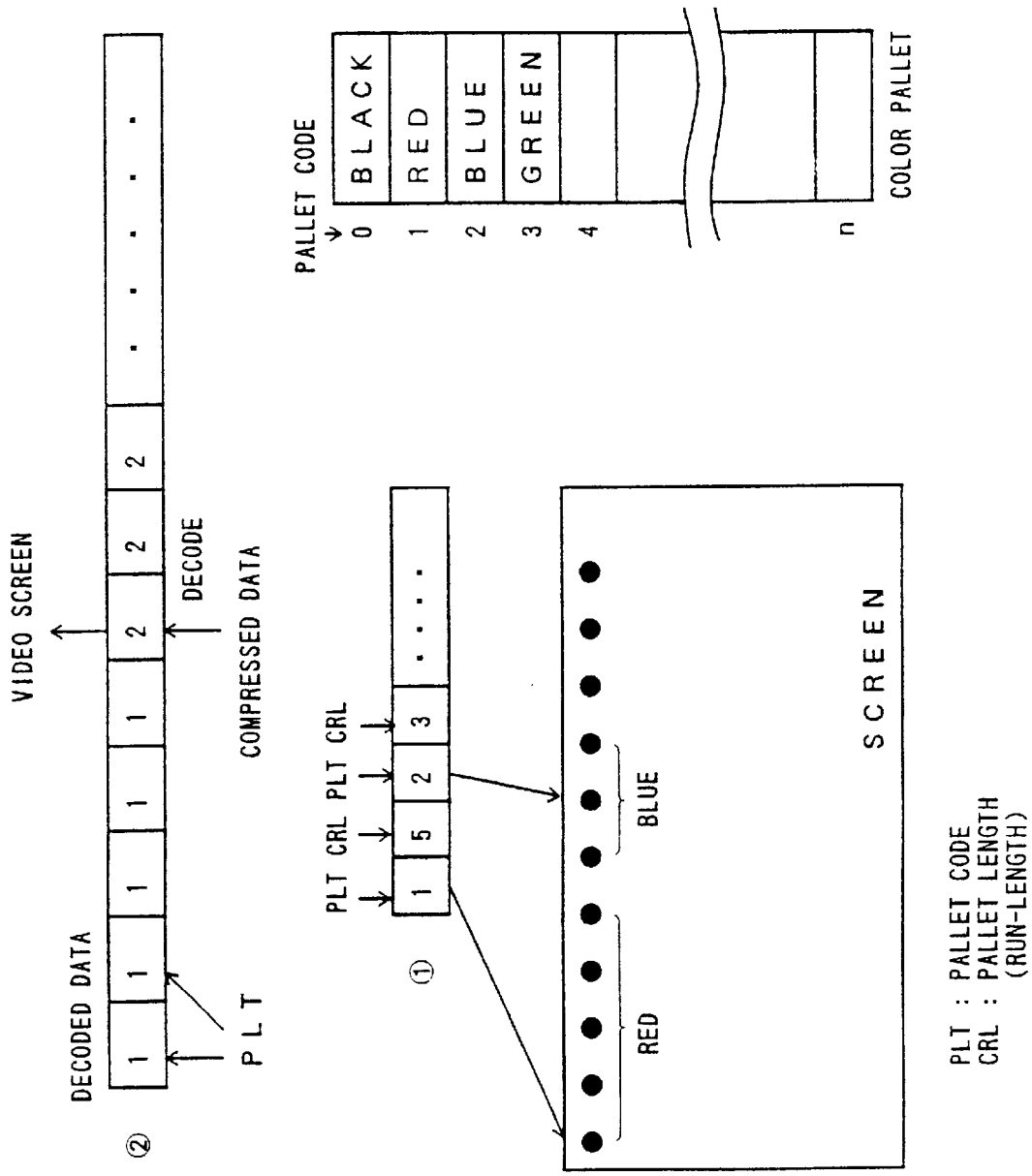
FIG. 16 is a diagram showing a relation between compressed image data and displayed dot image on the screen according to the invention.

For that reason, image data are compressed (encoded) to be transmitted, and then the compressed data are extended (decoded) to be displayed, as shown in FIG. 15. Each image data are composed of a pallet code (PLT) and the number (CRL) of the code, as shown in FIG. 16. The number (CRL) is called a pallet length or run-length, and the compression method is called a run-length method.

In the computer system, compressed data supplied from the control unit are extended by the image data extension unit to be reproduced, and then the data are stored in the RRAM. After that, the data are read from the RRAM for each color vector in accordance with a DCK cycle, and then the data are transmitted to the video encoder unit. According to the invention, timings for reading and transmitting data are controlled well to realized a horizontal scroll.

When color-vector factors are read from the RRAM with "read-timing", the color-vector factors are separated into brightness "Y" and color differences "U" and "V", and therefore, the image data are displayed on the screen without scroll. The read-timing is shifted in order to realize a horizontal scroll. The amount of the shift varies depending on whether the picture is scrolled by odd or even dots.

When the image data is scrolled by even dots, the color-vector factors are read at a timing for horizontal scroll, and the color-vector factors are transmitted at the same timing. All image data to be displayed do not always correspond to color vectors to be read. For example, image is scrolled by two dots to the left (horizontal scroll+2), and a color vector (Y2 Y3 U1 V1, - - - Yn−2 Yn−1 Um Vm, Z) is read, where m=(n−1)/2. Which data is read first is specified by a SCX register, which stores a value corresponding to BXR (count value) shown in FIG. 6.

Image data out of the real screen varies to be displayed depending on the scroll mode. In an endless scroll mode ("Chazutsu mode"), the outside data are displayed to be "Y0 Y1 U0 V0", and in a non-endless scroll mode ("non-Chazutsu mode), the outside data are displayed as transparent. In the endless scroll mode, color-vector factors scrolled out from one end of the real screen are again displayed from the other end.

When a picture is scrolled by odd dots at a timing shifted by one dot from a timing that is used for a non-scroll mode, the first color-vector factor is not read in the display period (HDISP). For example, when a picture is scrolled by 3 dots to the left (horizontal scroll +3), the vector (Y2 Y3 U1 V1, Y4 Y5 U2 V2, - - - , Yn−2 Yn−1 Um Vm, Z) is transmitted, where m=(n−1)/2. This vector is the same as that in the case of the two dot scroll; however, the reading timing is shifted so that "Y2 U1 V1" factors are not read in the display period, and as a result, the picture is scrolled by three dots.

In this embodiment, color data and run-length have a length which is an integral multiple of a length of each data block for image data to be transmitted.

Figure 17:
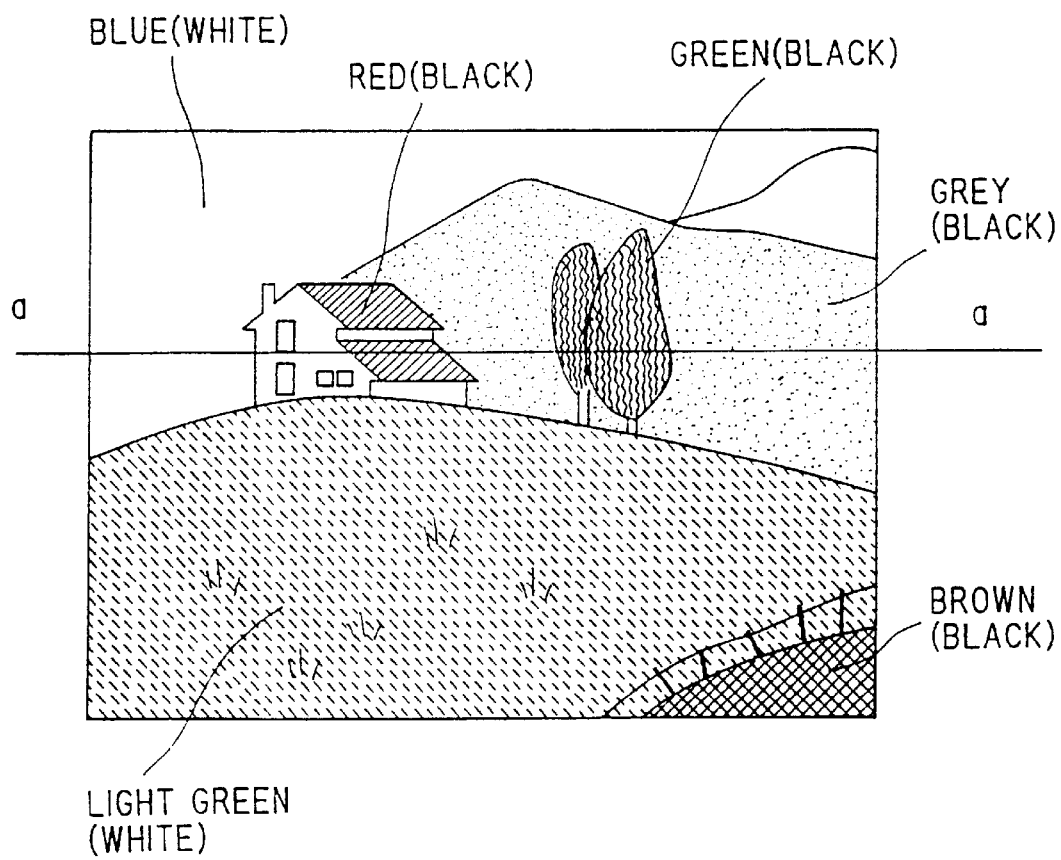
FIG. 17 is a picture to be displayed by the image processing system according to the invention.

FIG. 17 shows an example picture, which is displayed by the colors as shown in the figure, where the colors in parenthesis indicate colors for a monochrome mode. On a line "a—a", the color of the picture varies in the order of blue (65), red (20), white (15), red (40), grey (20), green (20) and grey (60), where the figures in the parenthesis indicate the numbers of dot corresponding to run-length for compressed data. In the monochrome mode, the color of the picture varies in the order of white (65), black (20), white (15) and black (140).

Figure 18:
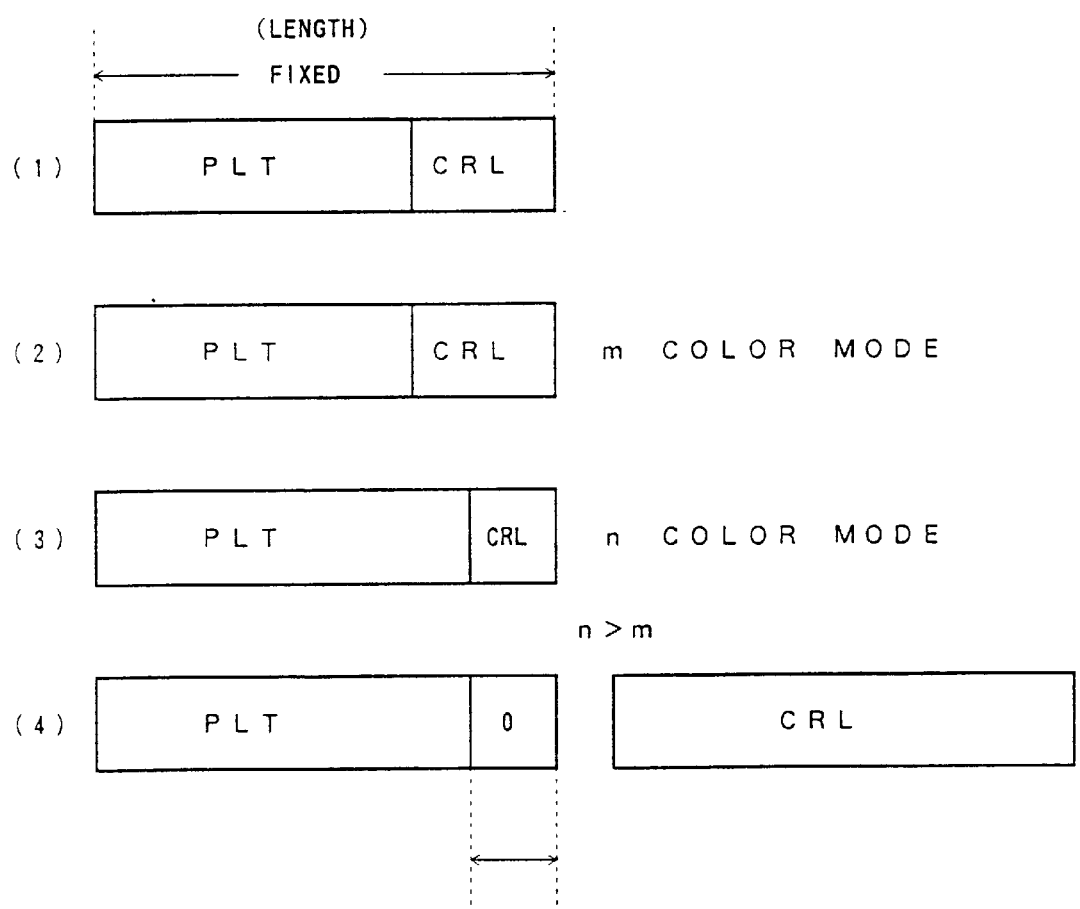
FIG. 18 is a diagram showing the format for run-length image data according to the invention.

The more the number of the color is increased, the more the run-length is shortened. In this embodiment, compressed data are formed to meet the following three conditions, as shown in FIG. 18:

(1) Compressed data are formed to have a length which is integral multiple of the width of the data bus (fixed length).

(2) Run-length is shortened in accordance with increment of a pallet code (PLT).

(3) If a run-length (CRL) is so large that the data can not be contained in the fixed length, the run-length is not transmitted with its data code and is contained in the following record itsself. This processing is called an "expansion mode".

According to the embodiment, the screen is divided into a plurality of horizontal blankings (nH) each composed of n-rasters, as shown in FIG. 19, so that a picture is displayed on the screen in plural color modes for each "nH" (n rasters).

The above mentioned processing is realized in accordance with the following steps, so that a color mode to be used and a color code are determined for each "nH" and dot, respectively:

(1) Detecting all color modes used in a picture to be displayed.

(2) Detecting a color mode of the largest number, and using the color mode for the block.

(3) Rewriting color data in the horizontal blankings in accordance with the color mode.

Such data are transmitted to another device as shown in FIG. 20, that is, the data has a marker code at the top and color data following the code.

This system uses VSYNC (V-blank) and HSYNC (H-blank) interrupt signals and a DCK signal to control display of image. When the HSYNC signal is supplied from the video encoder unit to the other devices, an interrupt operation is carried out, and compressed image data are transmitted for 16 rasters from the control unit to the image data extension unit. The image data extension unit reproduces the image data to be stored in the RRAM. In response to the DCK signal, an interrupt operation is carried out for each dot.

Figure 23:
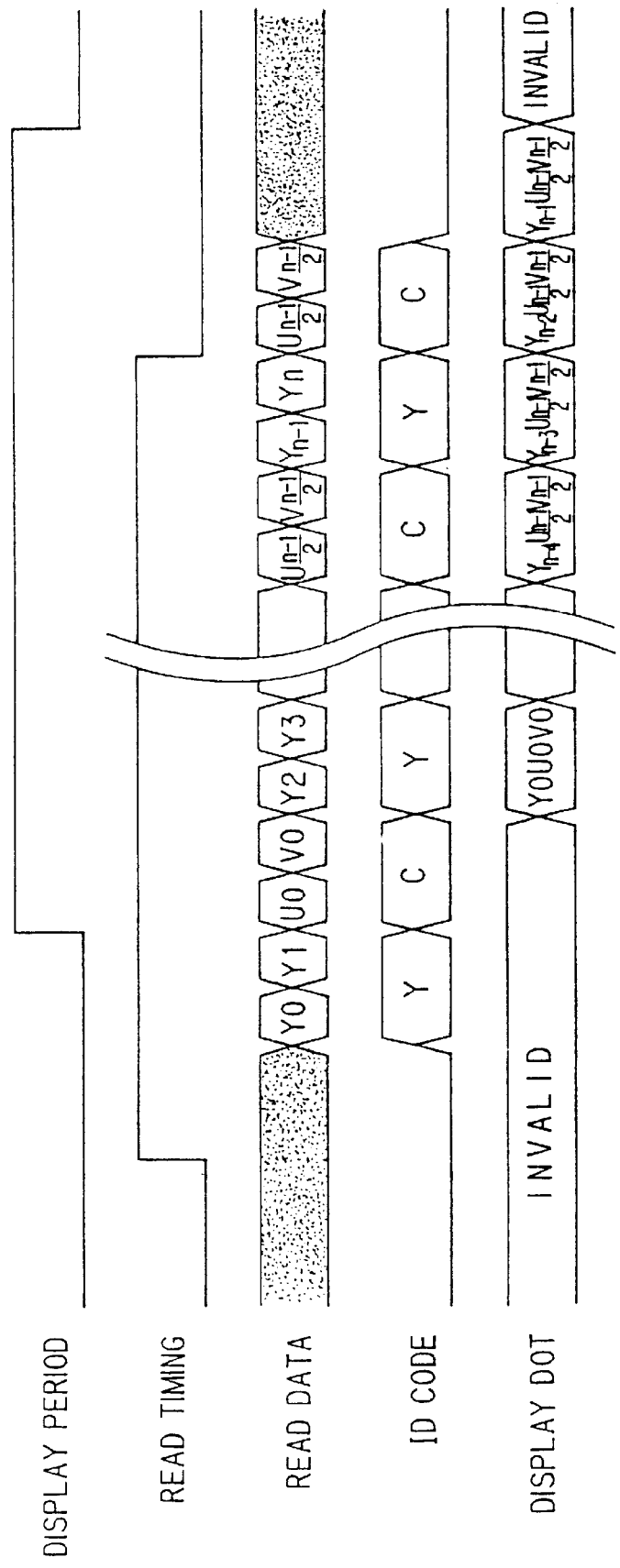
FIG. 23 is a timing chart for transmission of image data when the real screen is scrolled one dot to right, according to the invention.
Figure 24:
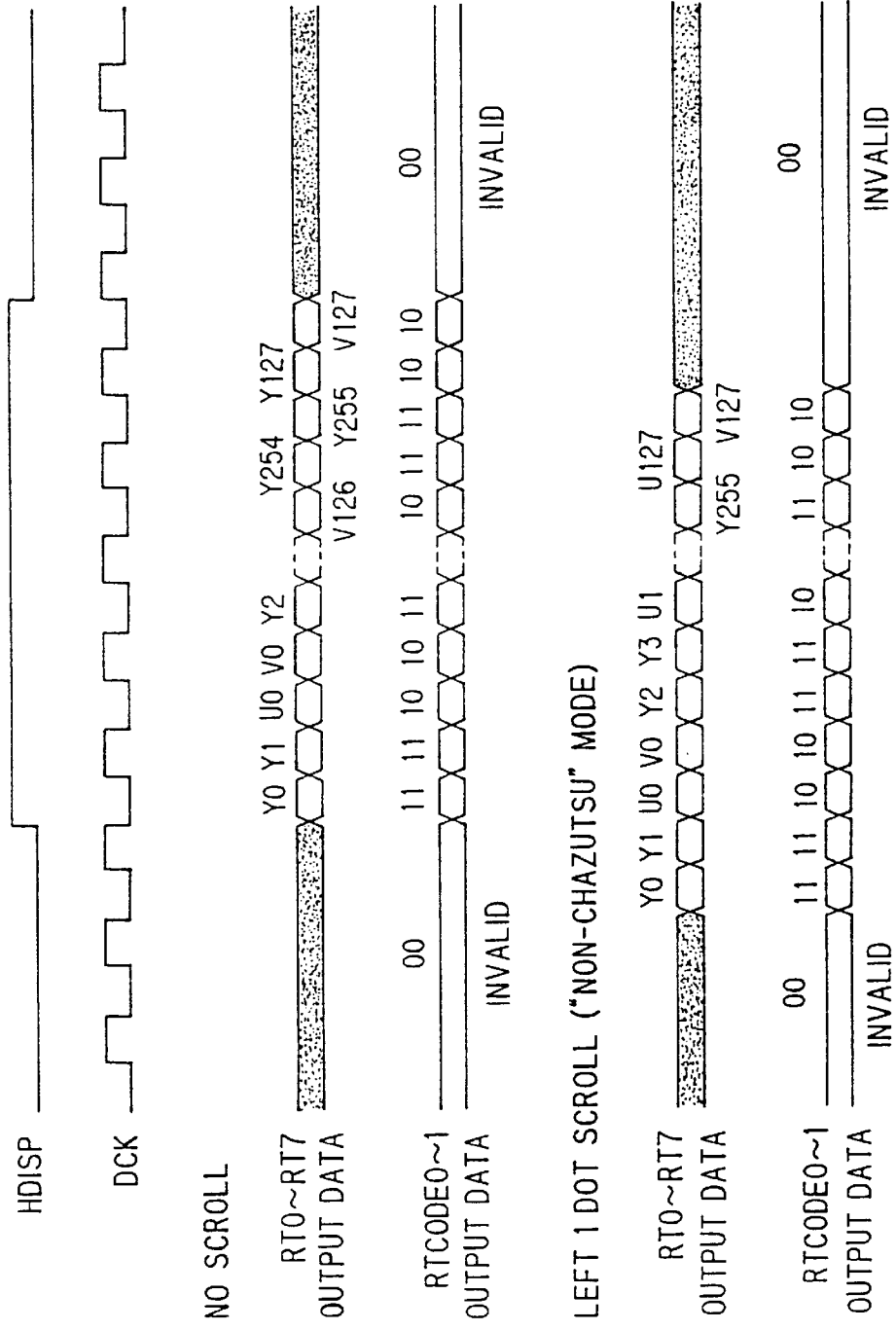
FIG. 24 is a timing chart for transmission of image data to a video encoder unit when the real screen is not scrolled, according to the invention.
Figure 26:
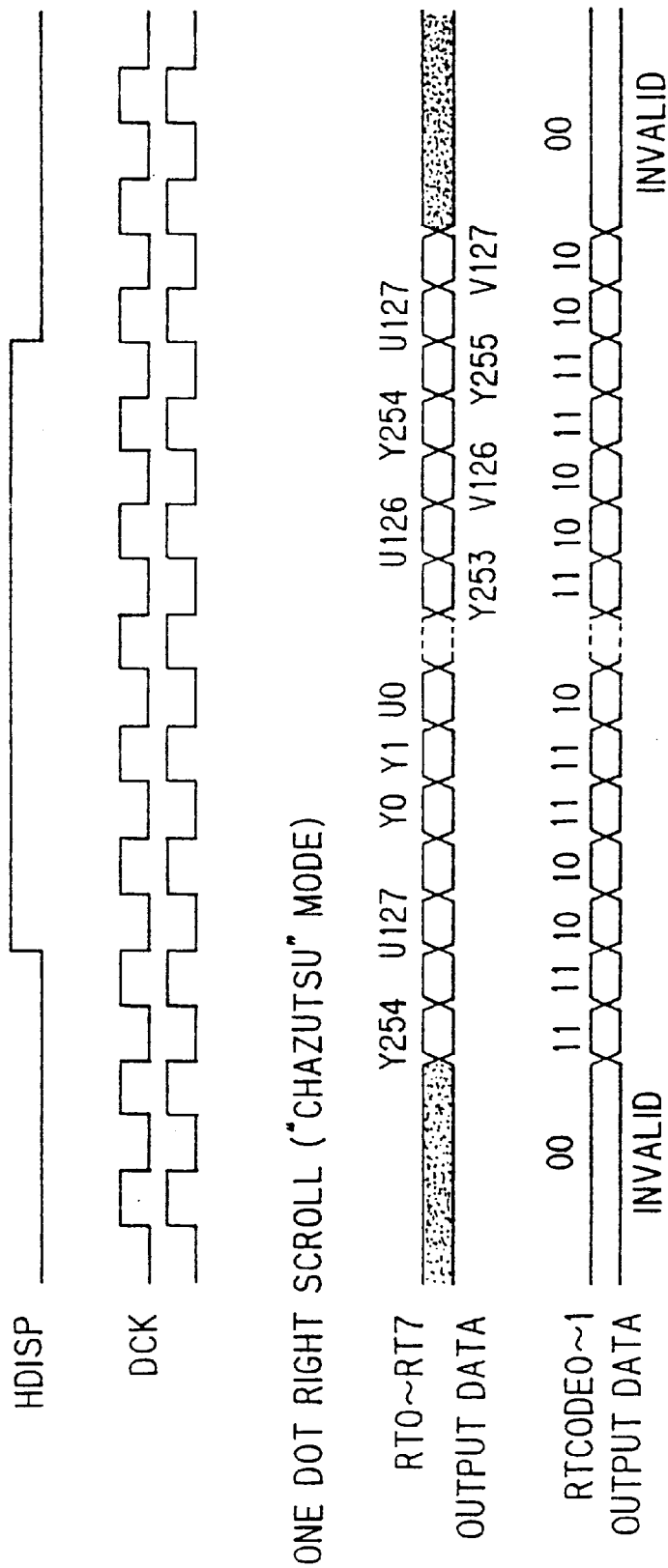
FIG. 26 is a timing chart for transmission of image data to the video encoder unit when the real screen is scrolled one dot to right, according to the invention.

Next, the operation of horizontal non-scroll (0) and one dot scrolls to the left (+1) and right (−1) is now explained in conjunction with FIGS. 21 to 26. FIGS. 21 to 23 and 24 to 26 show timings for reading and transmitting data, respectively. How many dots by which the screen is scrolled depends on the first colo-vector factor to be read, and whether odd or even scroll is performed depends on the timing for transmitting the image data. In FIGS. 24 to 26, "RT0 to RT7" and "RTCODE 1 to RTCODE 0" represent the types of data bus and types of image data on the data bus, respectively.

In response to a read-timing signal, first data (Y0 Y1 U0 V0) are read to be separated from each other, as shown in FIG. 21, and the separated data are transmitted to the video encoder unit so that non-horizontal scroll is performed. When the first dot is displayed, the next data (Y2 Y3 U1 V1) are buffered, and the processing is repeated to display the image entirely.

The first data (Y0 Y1 U0 V0) are read from a time two clocks prior to the read-timing, as shown in FIG. 22. At this time, data (Y0 U0 V0) are buffered; however, the data are not displayed by an INVALID signal because the data are not in a display period. Therefore, the image data are displayed from data (Y1 U0 V0), that is, the image is shifted one dot to the left. In this case, when the last dot becomes invalid, the data (Y0 U0 V0) and invalid signal are transmitted to the video encoder unit in the endless and non-endless scroll modes, respectively. As a result, the last dot is displayed as being transparent in the non-endless scroll mode.

The first data (Y0 Y1 U0 V0) are read at a time two clocks after the read-timing, as shown in FIG. 23, so that the first dot is not displayed and the data (Y0 U0 V0) are displayed from the second dot timing. As a result, the screen is scrolled by one dot to the right in the non-endless scroll mode. In the endless scroll mode, when the last color-vector factor (Yn−2 Yn−1 Um Vm) is read with the same timing as the case of the one-dot-left scroll, shown in FIG. 22, data (Yn−1 Um Vm) are displayed at the first dot on the screen.

When the YYUV type of data are transmitted to the video encoder unit, the data are decoded into YUV data by the unit. When the YUV data are not in the display period, the data are not displayed so that the horizontal scroll is performed.

Figure 27:
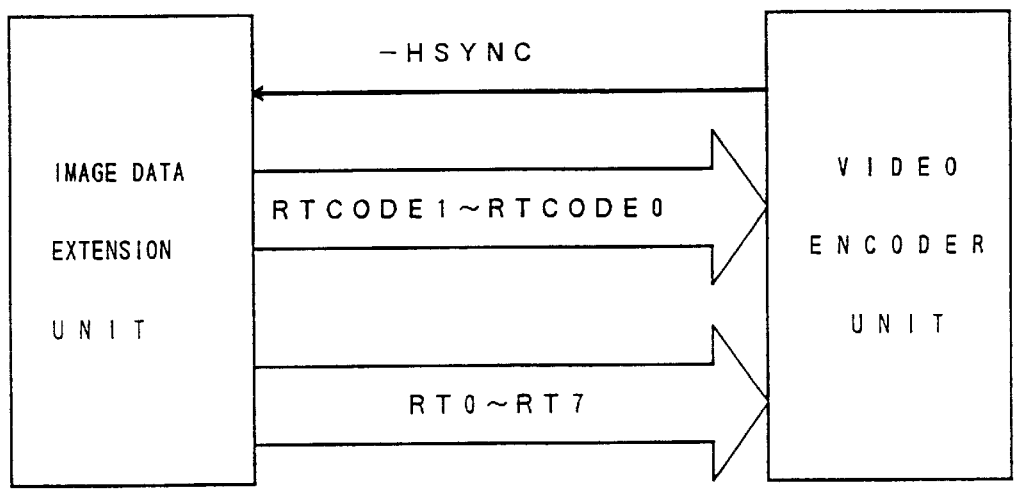
FIG. 27 is a diagram showing the operation for transmission between the image extension unit and video encoder unit according to the invention.

FIG. 27 shows a relation between the image data extension unit and video encoder unit.

FIG. 28 shows color vectors to be read and displayed in each scroll mode. In this table, "m," INVALID," DELAY TIMING, "+" and "−" represent (n−1)/2, no-display (transparent), delay time of the first vector factor from the read-timing, reading earlier and later, respectively.

Figure 29:
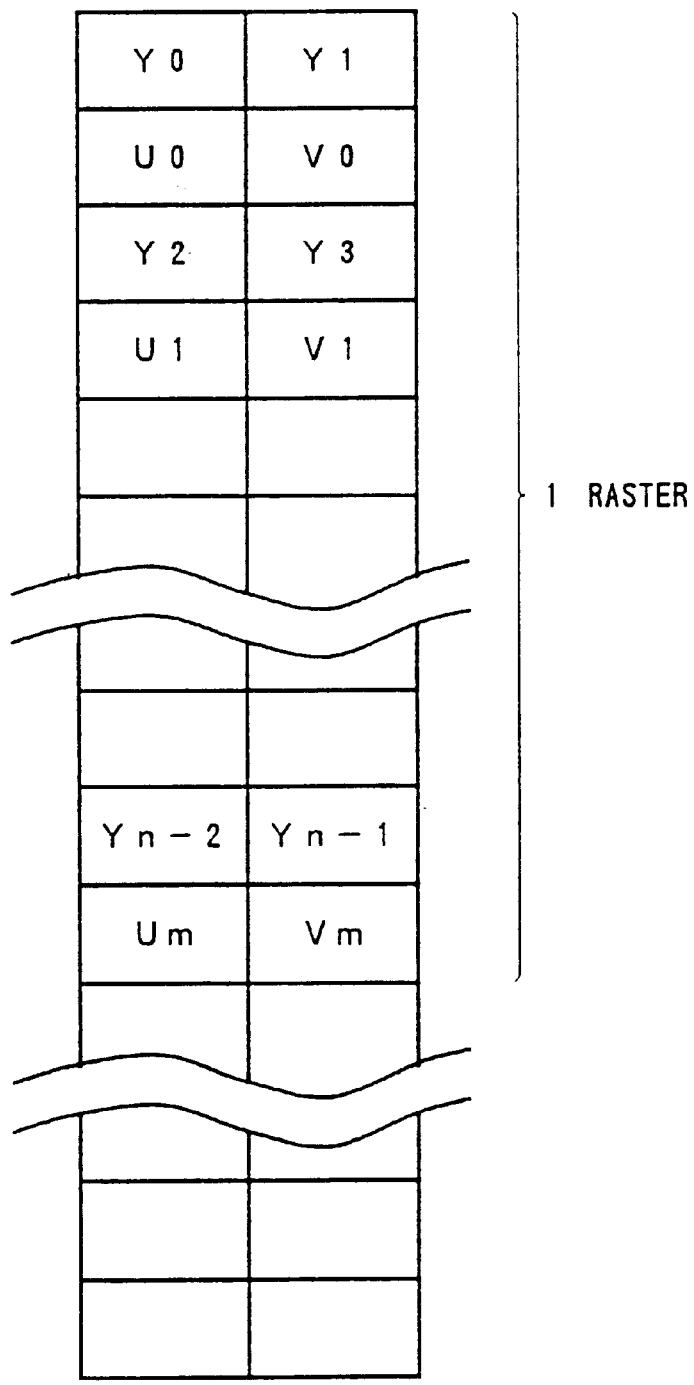
FIG. 29 is a diagram showing the arrangement for YYUV color data in a memory according to the invention.

FIG. 29 shows the arrangement for YYUV color data in the memory.

As described before, according to the invention, timings for reading and transmitting data are controlled to perform a horizontal scroll. As a result, even if color-vector factors do not correspond to dots in the screen one for one, a horizontal scroll may be realized smoothly.

Next, a second preferred embodiment will be explained. This embodiment also employs the computer system shown in FIG. 9.

CPU 102 directly controls a DRAM via a memory support, and performs communication through an I/O port to peripheral devices, that is called an I/O control function. CPU 102 includes a timer, a parallel I/O port and an interruption control system. VDP unit 114 reads display data which have been written in the VRAM by CPU 102. The display data are transmitted to video encoder unit 112 whereby the data are displayed on the TV display 116. VDP unit 114 has at most two screens each composed of background and sprite images, which are of an external block sequence type of 8×8 blocks.

Figure 30:
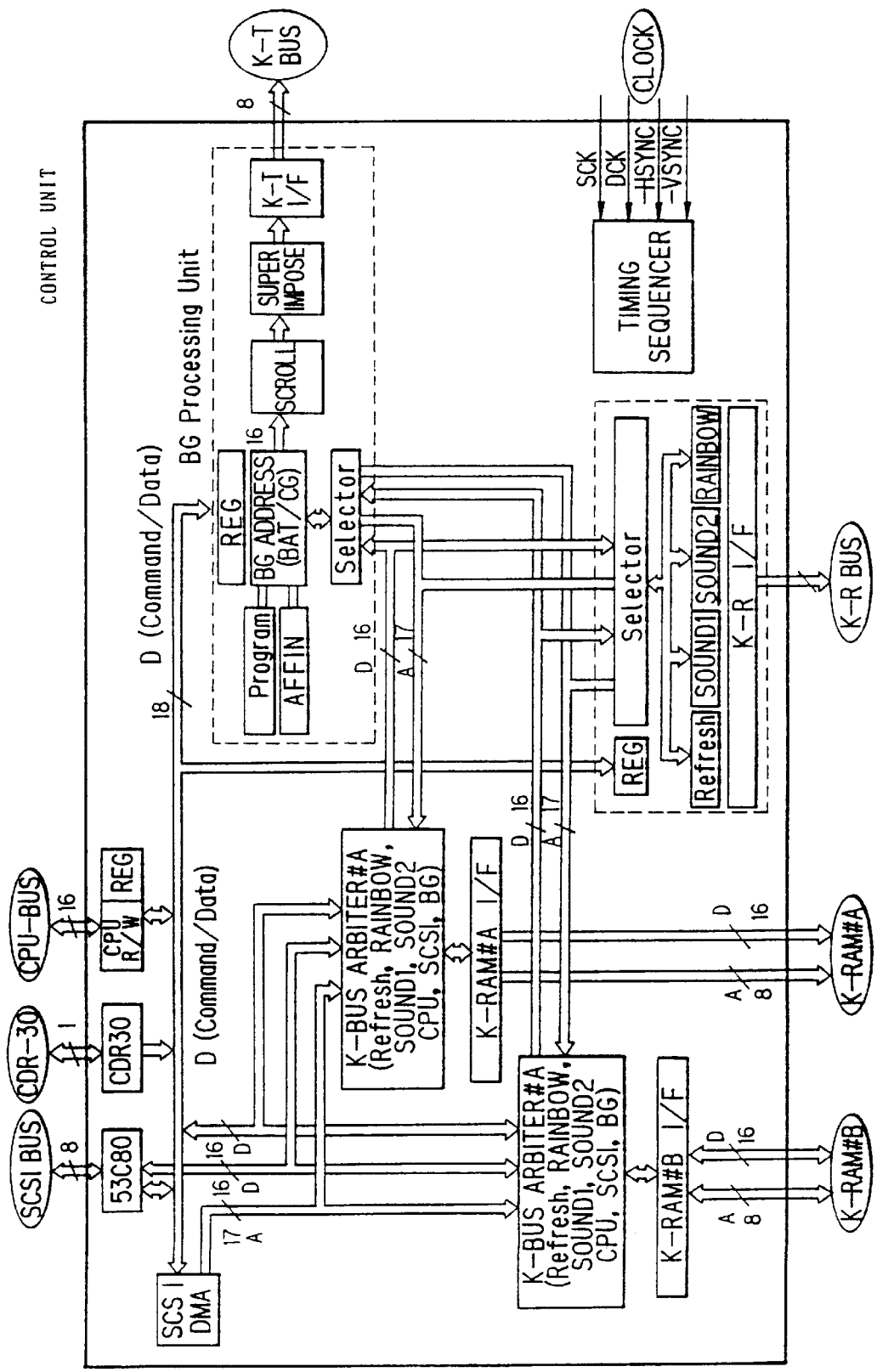
FIG. 30 is a block diagram showing a control unit, shown in FIG. 9, according to the invention.

FIG. 30 shows control unit 104. Control unit 104 includes an SCSI controller to which image and sound data are supplied through an SCSI interface from CD-ROM 100. Data supplied to the SCSI controller are buffered in the K-RAM. Control unit 104 also includes a DRAM controller for reading data which have been buffered in the K-RAM with a predetermined timing. In control unit 104, priority judgement is carried out for each dot of natural background image data, and an output signal is transmitted to video encoder unit 112.

Control unit 104 transmits moving image data (full color, pallet), which have been compressed, to image data extension unit 106 whereby the compressed data are extended.

Image data extension unit 106 includes an inverse DCT converter, an inverse quantizing means, a Huffman coding and decoding means and a run-length coding and decoding means. That is, the image data extension unit 106 performs a DCT transformation for a natural moving picture, and treats compressed data encoded by the Huffman coding method and run-length compressed data for a moving animation image and the like.

Video encoder unit 112 superimposes VDP image data, natural background image data and moving image data (full color, pallet) transmitted from VDP unit 114, control unit 104 and image data extension unit 108. Video encoder unit 112 performs color pallet reproducing, special effect processing, D/A converting and the like. Output data of video encoder unit 112 are encoded into an NTSC signal by an external circuit.

ADPCM sound data recorded in CD-ROM 100 are buffered in the K-RAM and then transmitted to sound data output unit 110 by control unit 104. The sound data are reproduced by sound data output unit 110.

Figure 31:
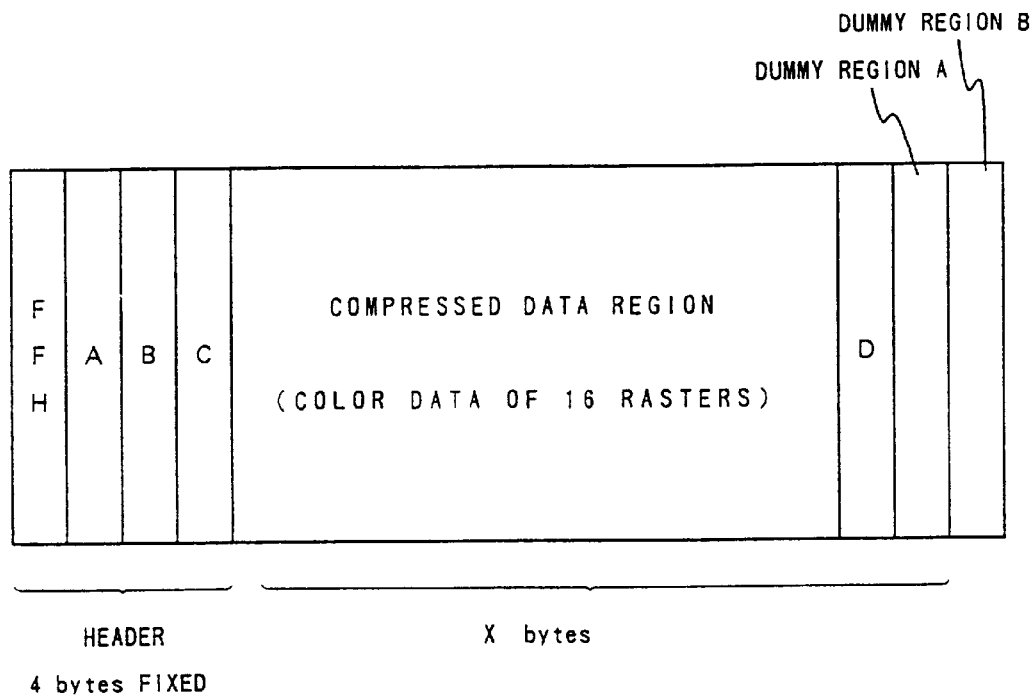
FIG. 31 is a diagram showing the format for compressed image data in the memory according to the invention.

FIG. 31 shows the format for compressed image data in the memory. In this embodiment, pallet colors in 16, 32, 64 and 128 color modes are employed to display images. Image data are transmitted for 16 rasters (lines) through a data bus of 8 bits. According to the system, plural color modes may be used for one screen; however, 16 raster data are displayed in a single color mode.

In FIG. 31, "A" specifies the type of image data. In the area "A", each of "FFH" and "F8H" represents IDCT compressed data for a natural picture. On the other hand, each of "F3H," F2H," F1H" and "F0H" represents image data with a color pallet for an animation picture. "F3H," F2H," F1H" and "F0H" represent run-length compressed data of 128, 64, 32 and 16 colors, respectively. "B," C" and "D" represent the first and last halves of bytes of a compressed data region and data for two byte boundary of compressed data, respectively.

Figure 32:
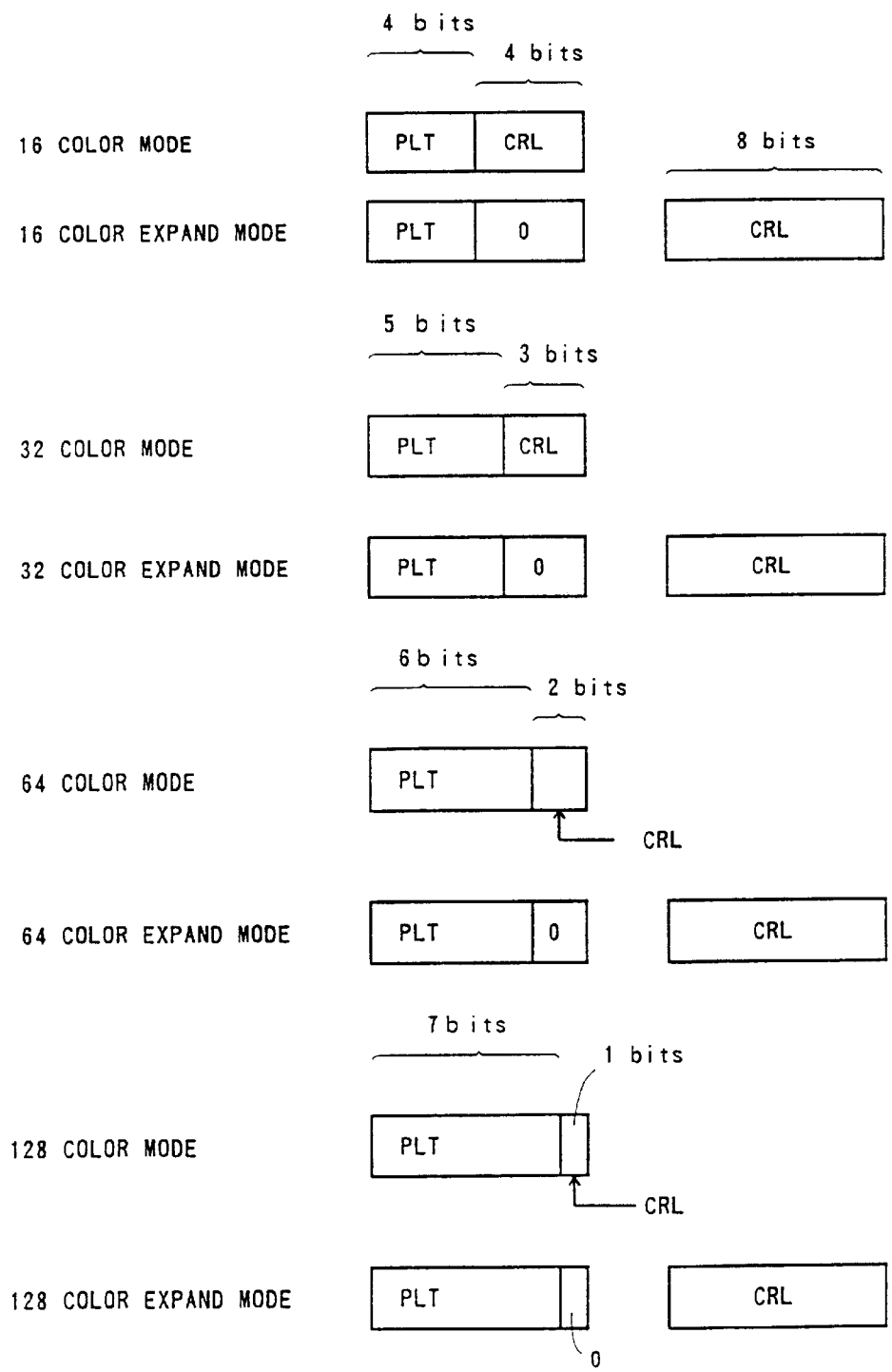
FIG. 32 is a diagram showing the format for compressed image data in each color mode according to the invention.

FIG. 32 shows the format for compressed image data in each color mode, which are stored in a compressed data region. In the 64 color mode, a region for run-length has 2 bits, and therefore, "4" is the maximum for binary number in the region. For that reason, for example, when 100 dots of a color corresponding to a pallet code 13 are displayed successively, "13" and "0" are contained in the first data block, and "100" is contained in the next data block. In the decoder, when "0" following the pallet code "13" is detected in the first data block, "100" in the following data block is judged to be run-length data, so that 100 of the same color corresponding to the pallet code "13" are displayed on the screen. If the expansion mode is not employed, 25 data blocks of "13+4" must be transmitted, and therefore, 200 bits data are totally necessary in this case.

As described before, according to the second preferred embodiment, compressed data may be decoded easily, because each compressed data have a length being integral multiple of the width of the data bus.

Next, a third preferred embodiment will be explained. The embodiment also uses the computer system shown in FIG. 9. The control unit reads image data from the CD-ROM to store the data in the K-RAM. The control unit reads the data from the K-RAM, so that the data are rotated, extended or the like, and then, the processed data are transmitted to the following stage. In the image data extension unit, a color mode is changed in accordance with a marker code placed at the top of 16H (16 horizontal blankings) data. When no marker code is detected, the current color mode is maintained to be employed.

In the computer system, animation and natural pictures may be displayed on different BG (background) screens. The control unit synthesizes four independent BG screens.

Figure 33:
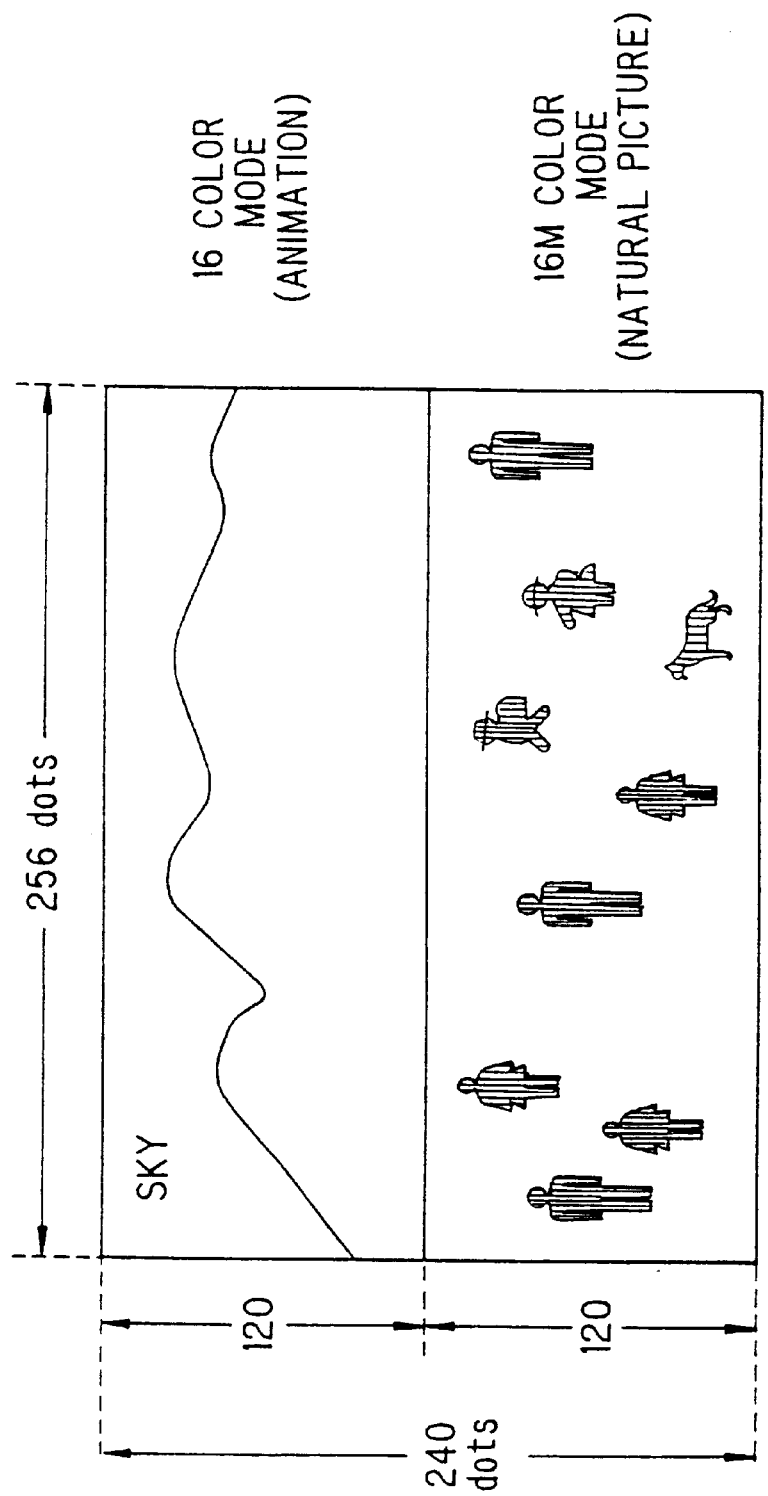
FIG. 33 is a diagram showing a sample picture, in which animation and natural pictures are synthesized, according to the invention.
Figure 34:
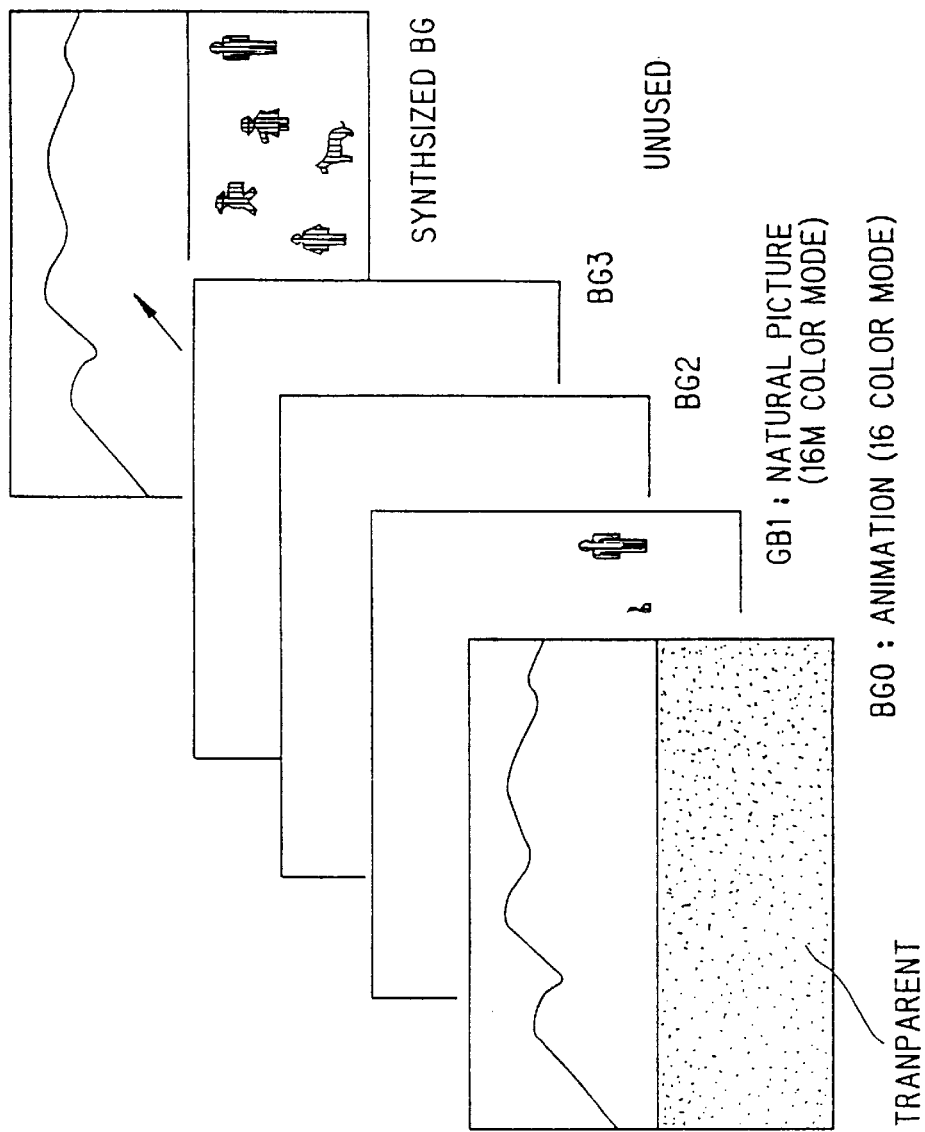
FIG. 34 is a diagram showing the operation for synthesizing the sample picture shown in FIG. 33, according to the invention.

When a picture divided along the horizon is displayed, as shown in FIG. 33, the upper and lower halves are treated to be animation and natural pictures, respectively. In the upper half, the blue sky and green mountain are displayed. In the lower half, people who are wearing colorful clothes and the like are displayed. This picture is displayed by synthesizing four BG pictures shown in FIG. 34.

If the picture is displayed only in the 16M color mode, a memory area of 180K bytes (256×240×3=184,320) is necessary. If the upper and lower halves are displayed in the 16 and 16M color modes, respectively, and the color mode is changed for each dot, 27 (=3+24) and 7 (=3+4) bits are necessary for each dot in the 16M and 16 color modes, respectively. In this case, 3 bits are used for the marker code to indicate the color mode. Therefore, a memory area of 127.5K bytes is necessary to display the picture entirely as follows:

$$256 \times 120 \times (27 + 7) = 1,044,480 \text{ bits}$$
$$= 130,560 \text{ bytes}$$
$$= 127.5k \text{ bytes}$$

According to the preferred embodiment, the color mode is changed for each 16H (16 horizontal blankings), and the 16M, 128, 64, 32 and 16 color modes are used to display the picture.

Figure 35:
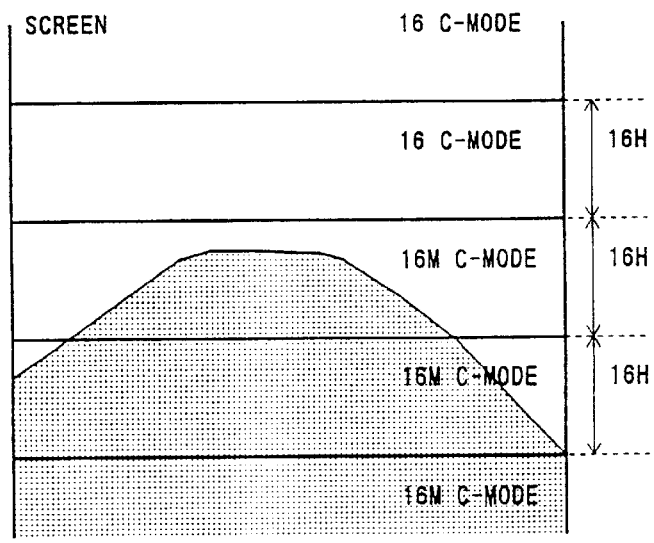
FIG. 35 is a diagram showing a sample picture, in which plural color mode are employed for one screen, according to the invention.

When a 16H-area includes both 16 and 16M color mode areas, as shown in FIG. 35, the area is displayed in the 16M color mode. In the picture, when plural 16H-areas having the same color mode are arranged successively, the color mode of the previous area is used again for the next area. When each marker code is defined by 8 bits, approximately 105K bytes data are necessary to display the picture shown in FIG. 33, as follows:

$$256 \times 120 \times (4 + 24) + 8 + 8 = 860,176 \text{ bits}$$
$$= 107,522 \text{ bytes}$$
$$= 105K \text{ bytes}$$

Figure 36:
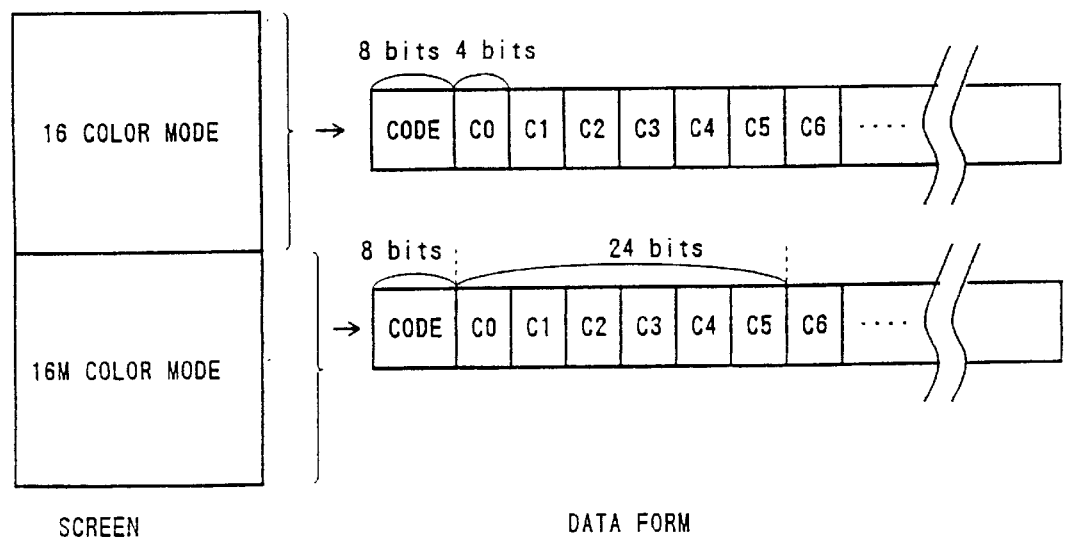
FIG. 36 is a diagram showing the data formats depending on the color modes according to the invention.

The data of 105K bytes corresponds to 58% of that in a single color mode of 16M, as shown in FIG. 36.

According to the third preferred embodiment, the memory may be used effectively, especially when animation and natural pictures are displayed together, and as a result, image data may be transmitted at a high speed. Further, encoding errors may be detected without a restart maker code used in the conventional system, because a color code is included in each 16H data block. That is, when a code other than the predetermined color codes is contained, an encoding error is detected.

What is claimed is:

1. An image processing system, comprising:

means for forming at least a first image data block including a color pallet code data having a first bit length;

means for determining whether run-length data corresponding to the color pallet code data has a second bit length greater, in combination with the first bit length of the color pallet code data, than a predetermined data bus width;

means for forming a second image data block including only the run-length data corresponding to the color pallet code data if the combined length of the first bit length and the second bit length is greater than the predetermined data bus width; and means for inserting a control element at an end of the color pallet code data if the combined length of the first bit length and the second bit length is greater than the predetermined data bus width, wherein each of the first image data block and the second image data block have a length that is an integral multiple of the predetermined data bus width.

2. An image processing system according to claim 1, wherein the control element is a zero control bit.

3. An image processing system, comprising:

means for forming image data blocks for each dot of image data to be transmitted, each of the image data blocks including a color code specifying a color of a dot and a run-length data following the color code for specifying a continuously displaying number of the color code; and means for adjusting a length of said each of the image data blocks whereby the length becomes an integral multiple of a predetermined fixed value;

wherein said forming means forms first and second image data blocks for dots of the continuously displaying number, when a number of bits assigned for the run-length is less than a number of bits specifying a run-length in one of the image data blocks, so that the first image data block includes the color code, while the second image data block includes the run-length.

\* \* \* \* \*